(12) United States Patent
Hunt et al.

(10) Patent No.: US 7,606,898 B1
(45) Date of Patent: Oct. 20, 2009

(54) SYSTEM AND METHOD FOR DISTRIBUTED MANAGEMENT OF SHARED COMPUTERS

(75) Inventors: Galen C. Hunt, Bellevue, WA (US);
Aamer Hydrie, Kirkland, WA (US);
Steven P. Levi, Redmond, WA (US);
David S. Stutz, Redmond, WA (US);
Bassam Tabbara, Seattle, WA (US);
Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2052 days.

(21) Appl. No.: 09/695,812

(22) Filed: Oct. 24, 2000

(51) Int. Cl.
*G06F 15/16* (2006.01)
*G06F 15/173* (2006.01)
(52) U.S. Cl. .................. 709/225; 709/226; 709/229
(58) Field of Classification Search .............. 709/220, 709/227, 201, 223–224, 226, 229, 225, 239, 709/246; 718/100; 707/10; 370/393
See application file for complete search history.

(56) References Cited

U.S. PATENT DOCUMENTS

| | | |
|---|---|---|
| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |
| 5,115,505 A | 5/1992 | Bishop et al. |
| 5,220,621 A | 6/1993 | Saitoh |
| 5,371,852 A | 12/1994 | Attanasio et al. |
| 5,430,810 A | 7/1995 | Saeki |
| 5,475,817 A | 12/1995 | Waldo et al. |
| 5,490,276 A | 2/1996 | Doli, Jr. et al. |
| 5,499,357 A | 3/1996 | Sonty et al. |
| 5,504,921 A | 4/1996 | Dev et al. |
| 5,539,883 A | 7/1996 | Allon et al. |

(Continued)

FOREIGN PATENT DOCUMENTS

CN 1368694 9/2002

(Continued)

OTHER PUBLICATIONS

Somers; "HYBIRD: Unifying Centralised and Distributed Network Management using Intelligent Agents"; Apr. 15, 1996; IEEE 1996; pp. 34-43.

(Continued)

*Primary Examiner*—Paul H Kang
(74) *Attorney, Agent, or Firm*—Lee & Hayes, PLLC

(57) ABSTRACT

A multi-tiered server management architecture is employed including an application development tier, an application operations tier, and a cluster operations tier. In the application development tier, applications are developed for execution on one or more server computers. In the application operations tier, execution of the applications is managed and sub-boundaries within a cluster of servers can be established. In the cluster operations tier, operation of the server computers is managed without concern for what applications are executing on the one or more server computers and boundaries between clusters of servers can be established. The multi-tiered server management architecture can also be employed in co-location facilities where clusters of servers are leased to tenants, with the tenants implementing the application operations tier and the facility owner (or operator) implementing the cluster operations tier.

27 Claims, 7 Drawing Sheets

U.S. PATENT DOCUMENTS

| | | | |
|---|---|---|---|
| 5,557,774 A | 9/1996 | Shimabukuro et al. | |
| 5,579,482 A | 11/1996 | Einkauf et al. | |
| 5,668,995 A | 9/1997 | Bhat | |
| 5,686,940 A | 11/1997 | Kuga | |
| 5,724,508 A | 3/1998 | Harple, Jr. et al. | |
| 5,748,958 A * | 5/1998 | Badovinatz et al. | 718/100 |
| 5,758,351 A | 5/1998 | Gibson et al. | |
| 5,768,271 A | 6/1998 | Seid et al. | |
| 5,774,660 A | 6/1998 | Brendel et al. | |
| 5,774,668 A | 6/1998 | Choquier et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,801,970 A | 9/1998 | Rowland et al. | |
| 5,802,590 A | 9/1998 | Draves | |
| 5,815,574 A | 9/1998 | Fortinsky | |
| 5,818,937 A | 10/1998 | Watson | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,850,399 A | 12/1998 | Ganmukhi et al. | |
| 5,867,706 A | 2/1999 | Martin et al. | |
| 5,872,914 A | 2/1999 | Walker, Jr. et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A | 6/1999 | Rittie et al. | |
| 5,918,017 A | 6/1999 | Attanasio et al. | |
| 5,930,798 A | 7/1999 | Lawler et al. | |
| 5,938,732 A | 8/1999 | Lim et al. | |
| 5,948,055 A | 9/1999 | Pulsipher et al. | |
| 5,951,694 A | 9/1999 | Choquier et al. | |
| 5,958,009 A | 9/1999 | Friedrich et al. | |
| 5,960,371 A | 9/1999 | Saito et al. | |
| 5,968,126 A | 10/1999 | Ekstrom et al. | |
| 6,012,113 A | 1/2000 | Tuckner | |
| 6,035,405 A | 3/2000 | Gage et al. | |
| 6,041,054 A | 3/2000 | Westberg | |
| 6,047,323 A | 4/2000 | Krause | |
| 6,047,325 A * | 4/2000 | Jain et al. | 709/227 |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,067,580 A | 5/2000 | Aman et al. | |
| 6,070,243 A | 5/2000 | See et al. | |
| 6,073,183 A | 6/2000 | Slonim | |
| 6,073,227 A | 6/2000 | Abily et al. | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,086,618 A | 7/2000 | Al-Hilali et al. | |
| 6,097,818 A | 8/2000 | Saito | |
| 6,098,093 A | 8/2000 | Bayeh et al. | |
| 6,108,699 A | 8/2000 | Moiin | |
| 6,108,702 A | 8/2000 | Wood | |
| 6,111,993 A | 8/2000 | Matsunaga | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,134,194 A | 10/2000 | Kato | |
| 6,134,594 A | 10/2000 | Helland et al. | |
| 6,141,749 A | 10/2000 | Coss et al. | |
| 6,144,959 A | 11/2000 | Anderson et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,167,515 A | 12/2000 | Lin | |
| 6,178,529 B1 | 1/2001 | Short et al. | |
| 6,182,275 B1 | 1/2001 | Beelitz et al. | |
| 6,185,308 B1 | 2/2001 | Ando et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,215,877 B1 | 4/2001 | Matsumoto | |
| 6,215,878 B1 | 4/2001 | Harkins | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 | 5/2001 | LeBlanc et al. | |
| 6,236,729 B1 | 5/2001 | Takaragi et al. | |
| 6,236,901 B1 | 5/2001 | Goss | |
| 6,253,230 B1 | 6/2001 | Couland et al. | |
| 6,256,773 B1 | 7/2001 | Bowman-Amuah | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,272,522 B1 | 8/2001 | Lin et al. | |
| 6,272,523 B1 | 8/2001 | Factor | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,317,438 B1 | 11/2001 | Trebes, Jr. | |
| 6,324,571 B1 | 11/2001 | Hacherl | |
| 6,327,622 B1 | 12/2001 | Jindal et al. | |
| 6,330,602 B1 | 12/2001 | Law et al. | |
| 6,330,605 B1 | 12/2001 | Christensen et al. | |
| 6,336,138 B1 | 1/2002 | Caswell et al. | |
| 6,336,171 B1 | 1/2002 | Coskrey, IV | |
| 6,338,112 B1 | 1/2002 | Wipfel et al. | |
| 6,341,356 B1 | 1/2002 | Johnson et al. | |
| 6,351,685 B1 | 2/2002 | Dimitri et al. | |
| 6,353,698 B1 | 3/2002 | Talamini, Sr. | |
| 6,353,861 B1 | 3/2002 | Dolin, Jr. et al. | |
| 6,353,898 B1 | 3/2002 | Wipfel et al. | |
| 6,360,265 B1 | 3/2002 | Falck et al. | |
| 6,366,578 B1 | 4/2002 | Johnson | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 | 5/2002 | Zager et al. | |
| 6,393,456 B1 | 5/2002 | Ambler et al. | |
| 6,393,474 B1 | 5/2002 | Eichert et al. | |
| 6,393,485 B1 | 5/2002 | Chao et al. | |
| 6,408,390 B1 | 6/2002 | Saito | |
| 6,424,718 B1 | 7/2002 | Holloway | |
| 6,424,992 B2 | 7/2002 | Devarakonda et al. | |
| 6,427,163 B1 * | 7/2002 | Arendt et al. | 709/201 |
| 6,427,171 B1 | 7/2002 | Craft et al. | |
| 6,438,100 B1 | 8/2002 | Halpern et al. | |
| 6,442,557 B1 | 8/2002 | Buteau et al. | |
| 6,442,713 B1 | 8/2002 | Block et al. | |
| 6,449,641 B1 | 9/2002 | Moiin et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,932 B1 | 10/2002 | Dennis et al. | |
| 6,466,978 B1 | 10/2002 | Mukherjee et al. | |
| 6,466,984 B1 | 10/2002 | Naveh et al. | |
| 6,466,985 B1 | 10/2002 | Goyal et al. | |
| 6,470,025 B1 | 10/2002 | Wilson et al. | |

| Patent | Kind | Date | Inventor(s) |
|---|---|---|---|
| 6,470,332 | B1 | 10/2002 | Weschler |
| 6,470,464 | B2 | 10/2002 | Bertram et al. |
| 6,473,791 | B1 | 10/2002 | Al-Ghosein et al. |
| 6,480,955 | B1 | 11/2002 | DeKoning et al. |
| 6,484,261 | B1 | 11/2002 | Wiegel |
| 6,487,622 | B1 | 11/2002 | Coskrey, IV et al. |
| 6,493,715 | B1 | 12/2002 | Funk et al. |
| 6,496,187 | B1 | 12/2002 | Deering et al. |
| 6,502,131 | B1 | 12/2002 | Vaid et al. |
| 6,505,244 | B1 | 1/2003 | Natarajan et al. |
| 6,510,154 | B1 | 1/2003 | Mayes et al. |
| 6,510,509 | B1 | 1/2003 | Chopra et al. |
| 6,519,615 | B1 * | 2/2003 | Wollrath et al. ............. 707/206 |
| 6,529,953 | B1 * | 3/2003 | Van Renesse ............... 709/223 |
| 6,539,494 | B1 | 3/2003 | Abramson et al. |
| 6,542,504 | B1 | 4/2003 | Mahler et al. |
| 6,546,423 | B1 | 4/2003 | Dutta et al. |
| 6,546,553 | B1 | 4/2003 | Hunt |
| 6,549,516 | B1 | 4/2003 | Albert et al. |
| 6,549,934 | B1 | 4/2003 | Peterson et al. |
| 6,564,252 | B1 | 5/2003 | Hickman et al. |
| 6,564,261 | B1 | 5/2003 | Gudjonsson et al. |
| 6,570,847 | B1 | 5/2003 | Hosein |
| 6,570,875 | B1 | 5/2003 | Hegde |
| 6,574,195 | B2 | 6/2003 | Roberts |
| 6,578,144 | B1 | 6/2003 | Gennaro et al. |
| 6,584,499 | B1 | 6/2003 | Jantz et al. |
| 6,587,876 | B1 | 7/2003 | Mahon et al. |
| 6,598,077 | B2 | 7/2003 | Primak et al. |
| 6,598,173 | B1 | 7/2003 | Sheikh et al. |
| 6,598,223 | B1 | 7/2003 | Vrhel, Jr. et al. |
| 6,601,101 | B1 * | 7/2003 | Lee et al. .................... 709/227 |
| 6,606,708 | B1 | 8/2003 | Shifrin et al. |
| 6,609,148 | B1 | 8/2003 | Salo et al. |
| 6,609,213 | B1 | 8/2003 | Nguyen et al. |
| 6,611,522 | B1 | 8/2003 | Zheng et al. |
| 6,615,256 | B1 * | 9/2003 | van Ingen et al. ........... 709/220 |
| 6,628,671 | B1 | 9/2003 | Dynarski et al. |
| 6,631,141 | B1 | 10/2003 | Kumar et al. |
| 6,640,303 | B1 | 10/2003 | Vu |
| 6,651,101 | B1 | 11/2003 | Gai et al. |
| 6,654,782 | B1 | 11/2003 | O'Brien et al. |
| 6,654,796 | B1 | 11/2003 | Slater et al. |
| 6,665,714 | B1 | 12/2003 | Blumenau et al. |
| 6,671,699 | B1 | 12/2003 | Black et al. |
| 6,675,308 | B1 | 1/2004 | Thomsen |
| 6,678,821 | B1 | 1/2004 | Waugh et al. |
| 6,678,835 | B1 | 1/2004 | Shah et al. |
| 6,681,262 | B1 | 1/2004 | Rimmer |
| 6,684,335 | B1 | 1/2004 | Epstein, III et al. |
| 6,691,148 | B1 | 2/2004 | Zinky et al. |
| 6,691,168 | B1 | 2/2004 | Bal et al. |
| 6,694,436 | B1 | 2/2004 | Audebert |
| 6,701,363 | B1 | 3/2004 | Chiu et al. |
| 6,717,949 | B1 | 4/2004 | Boden et al. |
| 6,718,361 | B1 | 4/2004 | Basani et al. |
| 6,718,379 | B1 | 4/2004 | Krishna et al. |
| 6,725,253 | B1 | 4/2004 | Okano et al. |
| 6,728,885 | B1 | 4/2004 | Taylor et al. |
| 6,735,596 | B2 | 5/2004 | Corynen |
| 6,738,736 | B1 | 5/2004 | Bond |
| 6,741,266 | B1 | 5/2004 | Kamiwada et al. |
| 6,742,020 | B1 | 5/2004 | Dimitroff et al. |
| 6,748,447 | B1 | 6/2004 | Basani et al. |
| 6,754,716 | B1 | 6/2004 | Sharma et al. |
| 6,754,816 | B1 | 6/2004 | Layton et al. |
| 6,757,744 | B1 | 6/2004 | Narisi et al. |
| 6,760,765 | B1 | 7/2004 | Asai et al. |
| 6,760,775 | B1 | 7/2004 | Anerousis et al. |
| 6,769,008 | B1 * | 7/2004 | Kumar et al. ................ 709/201 |
| 6,769,060 | B1 | 7/2004 | Dent et al. |
| 6,772,333 | B1 | 8/2004 | Brendel |
| 6,779,016 | B1 | 8/2004 | Aziz et al. |
| 6,782,408 | B1 | 8/2004 | Chandra et al. |
| 6,789,090 | B1 | 9/2004 | Miyake et al. |
| 6,801,528 | B2 | 10/2004 | Nassar |
| 6,801,937 | B1 * | 10/2004 | Novaes et al. ................ 709/220 |
| 6,804,783 | B1 | 10/2004 | Wesinger et al. |
| 6,813,778 | B1 | 11/2004 | Poli et al. |
| 6,816,897 | B2 | 11/2004 | McGuire |
| 6,820,042 | B1 | 11/2004 | Cohen et al. |
| 6,820,121 | B1 | 11/2004 | Callis et al. |
| 6,823,299 | B1 | 11/2004 | Contreras et al. |
| 6,823,373 | B1 | 11/2004 | Pancha et al. |
| 6,823,382 | B2 | 11/2004 | Stone |
| 6,829,639 | B1 | 12/2004 | Lawson et al. |
| 6,829,770 | B1 | 12/2004 | Hinson et al. |
| 6,836,750 | B2 | 12/2004 | Wong et al. |
| 6,845,160 | B1 | 1/2005 | Aoki |
| 6,853,841 | B1 | 2/2005 | St. Pierre |
| 6,854,069 | B2 | 2/2005 | Kampe et al. |
| 6,856,591 | B1 | 2/2005 | Ma et al. |
| 6,862,613 | B1 | 3/2005 | Kumar et al. |
| 6,868,062 | B1 | 3/2005 | Yadav et al. |
| 6,868,454 | B1 | 3/2005 | Kubota et al. |
| 6,880,002 | B1 | 4/2005 | Hirschfeld et al. |
| 6,882,613 | B2 | 4/2005 | Temple |
| 6,886,038 | B1 | 4/2005 | Tabbara et al. |
| 6,888,807 | B2 | 5/2005 | Heller et al. |
| 6,895,534 | B2 | 5/2005 | Wong et al. |
| 6,898,791 | B1 | 5/2005 | Chandy et al. |
| 6,904,458 | B1 | 6/2005 | Bishop et al. |
| 6,907,395 | B1 | 6/2005 | Hunt et al. |
| 6,912,568 | B1 | 6/2005 | Nishiki et al. |
| 6,915,338 | B1 | 7/2005 | Hunt et al. |
| 6,922,791 | B2 | 7/2005 | Mashayekhi et al. |
| 6,928,482 | B1 | 8/2005 | Ben Nun et al. |
| 6,944,183 | B1 | 9/2005 | Iyer et al. |
| 6,944,759 | B1 | 9/2005 | Crisan |
| 6,947,987 | B2 | 9/2005 | Boland |
| 6,957,186 | B1 | 10/2005 | Guheen et al. |
| 6,963,981 | B1 | 11/2005 | Bailey et al. |
| 6,968,291 | B1 | 11/2005 | Desai |
| 6,968,550 | B2 | 11/2005 | Branson et al. |
| 6,968,551 | B2 | 11/2005 | Hediger et al. |
| 6,971,063 | B1 | 11/2005 | Rappaport et al. |
| 6,971,072 | B1 | 11/2005 | Stein |
| 6,973,620 | B2 | 12/2005 | Gusler et al. |
| 6,973,622 | B1 | 12/2005 | Rappaport et al. |
| 6,976,079 | B1 | 12/2005 | Ferguson et al. |
| 6,976,269 | B1 | 12/2005 | Avery, IV et al. |
| 6,983,317 | B1 | 1/2006 | Bishop et al. |
| 6,985,956 | B2 | 1/2006 | Luke et al. |
| 6,990,666 | B2 | 1/2006 | Hirschfeld et al. |
| 7,003,562 | B2 | 2/2006 | Mayer |
| 7,003,574 | B1 | 2/2006 | Bahl |
| 7,012,919 | B1 | 3/2006 | So et al. |
| 7,013,462 | B2 | 3/2006 | Zara et al. |
| 7,016,950 | B2 | 3/2006 | Tabbara et al. |
| 7,024,451 | B2 | 4/2006 | Jorgenson |
| 7,027,412 | B2 | 4/2006 | Miyamoto et al. |
| 7,028,228 | B1 | 4/2006 | Lovy et al. |
| 7,035,786 | B1 | 4/2006 | Abu El Ata et al. |
| 7,035,930 | B2 | 4/2006 | Graupner et al. |
| 7,043,407 | B2 | 5/2006 | Lynch et al. |
| 7,043,545 | B2 | 5/2006 | Tabbara et al. |
| 7,046,680 | B1 | 5/2006 | McDysan et al. |
| 7,050,961 | B1 | 5/2006 | Lee et al. |
| 7,054,943 | B1 | 5/2006 | Goldszmidt et al. |
| 7,058,704 | B1 | 6/2006 | Mangipudi et al. |
| 7,058,826 | B2 | 6/2006 | Fung |
| 7,058,858 | B2 | 6/2006 | Wong et al. |
| 7,062,718 | B2 | 6/2006 | Kodosky et al. |
| 7,069,480 | B1 | 6/2006 | Lovy et al. |
| 7,069,553 | B2 | 6/2006 | Narayanaswamy et al. |
| 7,072,807 | B2 | 7/2006 | Brown et al. |

| | | | |
|---|---|---|---|
| 7,072,822 B2 | 7/2006 | Humenansky et al. | |
| 7,076,633 B2 | 7/2006 | Tormasov et al. | |
| 7,080,143 B2 | 7/2006 | Hunt et al. | |
| 7,082,464 B2 | 7/2006 | Hasan et al. | |
| 7,089,281 B1 | 8/2006 | Kazemi et al. | |
| 7,089,293 B2 | 8/2006 | Grosner et al. | |
| 7,089,530 B1 | 8/2006 | Dardinski et al. | |
| 7,093,005 B2 | 8/2006 | Patterson | |
| 7,093,288 B1 | 8/2006 | Hydrie et al. | |
| 7,096,258 B2 | 8/2006 | Hunt et al. | |
| 7,099,936 B2 | 8/2006 | Chase et al. | |
| 7,103,185 B1 | 9/2006 | Srivastava et al. | |
| 7,103,874 B2 | 9/2006 | McCollum et al. | |
| 7,113,900 B1 | 9/2006 | Hunt et al. | |
| 7,117,158 B2 | 10/2006 | Weldon et al. | |
| 7,117,261 B2 | 10/2006 | Kryskow, Jr. et al. | |
| 7,120,154 B2 | 10/2006 | Bavant et al. | |
| 7,124,289 B1 | 10/2006 | Suorsa | |
| 7,127,625 B2 | 10/2006 | Farkas et al. | |
| 7,131,123 B2 | 10/2006 | Suorsa et al. | |
| 7,134,011 B2 | 11/2006 | Fung | |
| 7,134,122 B1 | 11/2006 | Sero et al. | |
| 7,139,930 B2 | 11/2006 | Mashayekhi et al. | |
| 7,139,999 B2 | 11/2006 | Bowman-Amuah | |
| 7,143,420 B2 | 11/2006 | Radhakrishnan | |
| 7,146,353 B2 | 12/2006 | Garg et al. | |
| 7,150,015 B2 | 12/2006 | Pace et al. | |
| 7,152,109 B2 | 12/2006 | Suorsa et al. | |
| 7,152,157 B2 | 12/2006 | Murphy et al. | |
| 7,155,380 B2 | 12/2006 | Hunt et al. | |
| 7,155,490 B1 | 12/2006 | Malmer et al. | |
| 7,162,427 B1 | 1/2007 | Myrick et al. | |
| 7,162,509 B2 | 1/2007 | Brown et al. | |
| 7,174,379 B2 | 2/2007 | Agarwal et al. | |
| 7,181,731 B2 | 2/2007 | Pace et al. | |
| 7,191,344 B2 | 3/2007 | Lin et al. | |
| 7,194,439 B2 | 3/2007 | Kassan et al. | |
| 7,194,616 B2 | 3/2007 | Axnix et al. | |
| 7,197,418 B2 | 3/2007 | Fuller, III et al. | |
| 7,200,530 B2 | 4/2007 | Brown et al. | |
| 7,200,655 B2 | 4/2007 | Hunt et al. | |
| 7,203,911 B2 | 4/2007 | Williams | |
| 7,213,231 B1 | 5/2007 | Bandhole et al. | |
| 7,222,147 B1 | 5/2007 | Black et al. | |
| 7,225,441 B2 | 5/2007 | Kozuch et al. | |
| 7,231,410 B1 | 6/2007 | Walsh et al. | |
| 7,254,634 B1 | 8/2007 | Davis et al. | |
| 7,257,584 B2 | 8/2007 | Hirschfeld et al. | |
| 7,275,156 B2 | 9/2007 | Balfanz et al. | |
| 7,278,273 B1 | 10/2007 | Whitted et al. | |
| 7,281,154 B2 | 10/2007 | Mashayekhi et al. | |
| 7,302,608 B1 | 11/2007 | Acharya et al. | |
| 7,305,549 B2 | 12/2007 | Hunt et al. | |
| 7,305,561 B2 | 12/2007 | Hunt et al. | |
| 7,313,573 B2 | 12/2007 | Leung et al. | |
| 7,315,801 B1 | 1/2008 | Dowd et al. | |
| 7,333,000 B2 | 2/2008 | Vassallo | |
| 7,349,891 B2 | 3/2008 | Charron et al. | |
| 7,350,068 B2 | 3/2008 | Anderson et al. | |
| 7,350,186 B2 | 3/2008 | Coleman et al. | |
| 7,367,028 B2 | 4/2008 | Kodosky et al. | |
| 7,370,103 B2 | 5/2008 | Hunt et al. | |
| 7,376,125 B1 | 5/2008 | Hussain et al. | |
| 7,379,982 B2 | 5/2008 | Tabbara | |
| 7,386,721 B1 | 6/2008 | Vilhuber et al. | |
| 7,395,320 B2 | 7/2008 | Hunt et al. | |
| 7,403,901 B1 | 7/2008 | Carley et al. | |
| 7,406,517 B2 | 7/2008 | Hunt et al. | |
| 7,461,249 B1 | 12/2008 | Pearson et al. | |
| 7,464,147 B1 | 12/2008 | Fakhouri et al. | |
| 2001/0014158 A1 | 8/2001 | Baltzley | |
| 2001/0016909 A1 | 8/2001 | Gehrmann | |
| 2001/0019554 A1 | 9/2001 | Nomura et al. | |
| 2001/0020228 A1 | 9/2001 | Cantu et al. | |
| 2001/0039585 A1 | 11/2001 | Primak et al. | |
| 2001/0047400 A1 | 11/2001 | Coates et al. | |
| 2001/0051937 A1 | 12/2001 | Ross et al. | |
| 2002/0009079 A1 | 1/2002 | Jungck et al. | |
| 2002/0010771 A1 | 1/2002 | Mandato | |
| 2002/0022952 A1 | 2/2002 | Zager et al. | |
| 2002/0038421 A1 | 3/2002 | Hamada | |
| 2002/0040402 A1 | 4/2002 | Levy-Abegnoli et al. | |
| 2002/0049573 A1 | 4/2002 | El Ata | |
| 2002/0057684 A1 | 5/2002 | Mlyamoto et al. | |
| 2002/0069267 A1 | 6/2002 | Thiele | |
| 2002/0069369 A1 | 6/2002 | Tremain | |
| 2002/0075844 A1 | 6/2002 | Hagen | |
| 2002/0087264 A1 | 7/2002 | Hills et al. | |
| 2002/0090089 A1 | 7/2002 | Branigan et al. | |
| 2002/0095524 A1 | 7/2002 | Sanghvi et al. | |
| 2002/0099785 A1 | 7/2002 | Teeple | |
| 2002/0120761 A1 | 8/2002 | Berg | |
| 2002/0131601 A1 | 9/2002 | Ninomiya et al. | |
| 2002/0138551 A1 | 9/2002 | Erickson | |
| 2002/0152086 A1 | 10/2002 | Smith et al. | |
| 2002/0156900 A1 | 10/2002 | Marquette et al. | |
| 2002/0171690 A1 | 11/2002 | Fox et al. | |
| 2002/0194342 A1 | 12/2002 | Lu et al. | |
| 2002/0194345 A1 | 12/2002 | Lu et al. | |
| 2002/0194369 A1 | 12/2002 | Rawlings et al. | |
| 2002/0198995 A1 | 12/2002 | Liu et al. | |
| 2003/0008712 A1 | 1/2003 | Poulin | |
| 2003/0009559 A1 | 1/2003 | Ikeda | |
| 2003/0014644 A1 | 1/2003 | Burns et al. | |
| 2003/0028642 A1 | 2/2003 | Agarwal et al. | |
| 2003/0028770 A1 | 2/2003 | Litwin, Jr. et al. | |
| 2003/0041139 A1 | 2/2003 | Beadles et al. | |
| 2003/0041142 A1 | 2/2003 | Zhang et al. | |
| 2003/0041159 A1 | 2/2003 | Tinsley et al. | |
| 2003/0046615 A1 | 3/2003 | Stone | |
| 2003/0051049 A1 | 3/2003 | Noy et al. | |
| 2003/0056063 A1 | 3/2003 | Hochmuth et al. | |
| 2003/0065743 A1 | 4/2003 | Jenny et al. | |
| 2003/0069369 A1 | 4/2003 | Belenkaya et al. | |
| 2003/0074395 A1 | 4/2003 | Eshghi et al. | |
| 2003/0101284 A1 | 5/2003 | Cabrera et al. | |
| 2003/0105963 A1 | 6/2003 | Slick et al. | |
| 2003/0120763 A1 | 6/2003 | Voilpano | |
| 2003/0126230 A1 | 7/2003 | Donatelli et al. | |
| 2003/0126464 A1 | 7/2003 | McDaniel et al. | |
| 2003/0130833 A1 | 7/2003 | Brownell et al. | |
| 2003/0138105 A1 | 7/2003 | Challener et al. | |
| 2003/0154404 A1 | 8/2003 | Beadles et al. | |
| 2003/0165140 A1* | 9/2003 | Tang et al. | 370/393 |
| 2003/0204734 A1 | 10/2003 | Wheeler | |
| 2003/0206548 A1 | 11/2003 | Bannai et al. | |
| 2003/0214908 A1 | 11/2003 | Kumar et al. | |
| 2003/0217263 A1 | 11/2003 | Sakai | |
| 2003/0225563 A1 | 12/2003 | Gonos | |
| 2004/0002878 A1 | 1/2004 | Maria Hinton | |
| 2004/0054791 A1 | 3/2004 | Chakraborty et al. | |
| 2004/0068631 A1 | 4/2004 | Ukeda et al. | |
| 2004/0073443 A1 | 4/2004 | Gabrick et al. | |
| 2004/0073795 A1 | 4/2004 | Jablon | |
| 2004/0078787 A1 | 4/2004 | Borek et al. | |
| 2004/0111315 A1 | 6/2004 | Sharma et al. | |
| 2004/0117438 A1 | 6/2004 | Considine et al. | |
| 2004/0117476 A1 | 6/2004 | Steele et al. | |
| 2004/0160386 A1 | 8/2004 | Michelitsch et al. | |
| 2004/0161111 A1 | 8/2004 | Sherman | |
| 2004/0193388 A1 | 9/2004 | Outhred et al. | |
| 2004/0199572 A1 | 10/2004 | Hunt et al. | |
| 2004/0205179 A1 | 10/2004 | Hunt et al. | |
| 2004/0208292 A1 | 10/2004 | Winterbottom | |
| 2004/0226010 A1 | 11/2004 | Suorsa | |
| 2004/0261079 A1 | 12/2004 | Sen | |

| | | | |
|---|---|---|---|
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102388 A1 | 5/2005 | Tabbara et al. |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0246771 A1 | 11/2005 | Hunt et al. |
| 2005/0251783 A1 | 11/2005 | Torone et al. |
| 2005/0257244 A1 | 11/2005 | Joly et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 | 2/2006 | Vinberg et al. |
| 2006/0048017 A1 | 3/2006 | Anerousis et al. |
| 2006/0123040 A1 | 6/2006 | McCarthy et al. |
| 2006/0149838 A1 | 7/2006 | Hunt et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0235664 A1 | 10/2006 | Vinberg et al. |
| 2006/0259609 A1 | 11/2006 | Hunt et al. |
| 2006/0259610 A1 | 11/2006 | Hunt et al. |
| 2006/0271341 A1 | 11/2006 | Brown et al. |
| 2007/0006177 A1 | 1/2007 | Aiber et al. |
| 2007/0112847 A1 | 5/2007 | Dublish et al. |
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| CN | 1375685 | 10/2002 |
| EP | 0 962 861 A2 | 12/1999 |
| EP | 0964546 | 12/1999 |
| EP | 1063815 | 12/2000 |
| EP | 1180886 A1 | 2/2002 |
| EP | 1307018 A1 | 5/2003 |
| JP | 8297567 | 11/1996 |
| JP | 11007407 | 1/1999 |
| JP | 11340980 A | 12/1999 |
| JP | 2000293497 A | 10/2000 |
| JP | 2001339437 A | 12/2001 |
| JP | 20011526814 | 12/2001 |
| JP | 2002084302 | 3/2002 |
| JP | 2002354006 A | 12/2002 |
| JP | 2003532784 | 11/2003 |
| JP | 2005155729 | 12/2006 |
| WO | WO9930514 A2 | 6/1999 |
| WO | WO9963439 | 12/1999 |
| WO | WO0022526 | 4/2000 |
| WO | WO0031945 | 6/2000 |
| WO | WO0073929 | 12/2000 |
| WO | WO0237748 | 5/2002 |
| WO | WO02085051 | 10/2002 |
| WO | WO03/017615 A1 | 2/2003 |
| WO | WO03027876 A1 | 4/2003 |
| WO | WO03039104 | 5/2003 |

OTHER PUBLICATIONS

Smith, et al; "Distributed Management of Future Global Multi-Service Networks"; 8076 British Telecommunications Engineering; Oct. 13, 1994; Pt. 3, London, GB.

Webster's Seventh New Collegiate Dictionary, G.C. Merriam Co. Copyright 1971, pp. 438 & 767.

Li, Hsiang-Ling, Chakrabarti, Chaitali; "Hardware Design of a 2-D Motion Estimation System Based on the Hough Transform" IEEE 1998; 16 pages.

Howard et al., "Designing Secure Web-Based Applications for Microsoft Windows 2000", 2000.

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Shi et al., "An Effective Model for Composition of Secure Systems", The Journal of Systems and Software, 1998, pp. 233-244.

Svend Frolund & Pankaj Garg, "Design-Time Simulation of a Large-Scale, Distributed Object System" ACM 1998, pp. 374-400.

Liu et al., "Visualization in Network Topology Optimization", ACM, 1992, pp. 131-138.

Bagrodia, et al., "A Scalable Distributed Middleware Service Architecture to Support Mobile Internet Applications," Wireless Networks V.9 N Jul. 4, 2003 Kluwer Academic Publishers, Manufactured int he Netherlands; pp. 311-320.

"C.O.B.A.S Centralized Out-Of-Band Authentication System", QT Wordtel Inc., Sep. 8-9, 2003, p. 14.

Chao, "Next Generation Routers," Proceedings of the IEEE. vol. 90 No. 9 Sep. 2002.

Chen, et al., "Performance Prediction of Component-based Applications", available at least as early as Jan. 10, 2007, at <<http://www.ug.it.usyd.edu.au/~iango/papers/jss_paper_draft_0503.pdf>>, pp. 1-12.

Choi, et al., "A High-Speed Multi-layer Lookup for Policy Based Packet Classification Using TCAM," Proccedings of the IASTED Interantional Conference Communication Systems and Networks Sep. 9-12, 2002 Malaga Spain.

Cohen, et al., "On the Performance of TCP Splicing for URL-Aware Redirection," Proceedings of UITS'99: The 2nd USENIX Symposium on Internet Technologies & Systems; Boulder Colorado USA Oct. 11-14, 1999; 10 pages.

"Enhanced IP Services for Cisco Networks", retrieved on Jun. 19, 2007, at <<http://proquest.safaribooksonline.com/1578701066>>, Sep. 23, 1999, p. 11.

Frolund, et al., "Design-Time Simulation of a Large-Scale, Distributed object System" ACM 1998, pp. 374-400.

Gopal, et al., "Policy Based Access Router Selections and Context Transfers in Mobile IP," Network Control and Engineering for QoS; Security and Mobility (net-Con 2002).

Harbour, et al., "MAST An Open Environment for Modeling, Analysis, and Design of Real-Time Systems", available at least as Jan. 10, 2007, at <<http://citeseer.ist.psu.edu/cache/papers/cs/30959/http:zSzzSzwww.ctr.unican.eszSzpublicationszSzmgh-jlm-jjg-jcp-jmd-2002a.pdf/mast-an-open-environment.pdf>>, pp. 1-16.

Hardwick, et al., "Modeling the Performance of E-Commerce Site", Jan. 6, 2007, at <<http://www.cs.cmu.edu/~jch/publications/hardwick01modeling.html>>, Journal of Computer Resource Management, 2002, pp. 1-11.

Iyer, et al., "ClassiPI: An Archetecture for Fast and Flexible Packet Classification," IEEE Network, Mar./Apr. 2001, vol. 15 No. 2.

Kihl, "Admission Control Schemes Guaranteeing Customer Q0S in Commercial Web Sites," Network Control and Engineering for QoS Security and Mobility (Net-Con 2002); Oct. 22, pp. 305-316.

Kim, et al., "Content-Adaptive Request Distribution Strategy for INternet Server Cluster," W. Change (ed): Asia 2002 LNCs 2402 pp. 85-94 Aug. 2002. copyright Springer-Verlag Berlin Heidelberg 2002.

Kounev, "A Capacity Planning Methodology for Distrubuted E-Commerce Applications", Jan. 2, 2001, pp. 1-13.

Levillain, et al., "Switch-Based Derver Load Balancing for Enterprises," Alcatel Telecommunications Review; No. 4 pp. 298-302; 2002.

Mahon, "OpenView PolicyXpert: Heterogeneous Configuration and Control", OpenView Policy-Based Network Management, Feb. 1999, 4 pages.

Maughan et al., "Security Associations: Building Blocks for Secure Communications", IEEE - Symposium on Computers and Communications, pp. 157-163, 1995.

Moore, "Network Interoperability Program", MILCOM 97 Proceedings, vol. 3, pp. 1152-1155, 1997.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

"Pretty Good Privacy PGP for Personal Privacy, Version 5.0 For Windows 95 Windows NT", Pretty Good Privacy Inc., 1997, p. 137.

Schneier, "Applied Cryptography Protocols, Algorithms and Source Code in C, Second Edition", 1996, John Wiley & Sons, Inc., New York, p. 461, pp. 466-468, pp. 513-514.

Selic, "A Generic Framework for Modeling Resources with UML", available at least as early as Jan. 10, 2007, at <<http://ieeexplore.ieee.org/iel5/2/18367/00846320.pdf?isNumber=>>, IEEE, Jun. 2000, pp. 64-69.

Somegawa, et al., "The Effects of Server Placement and server selection for Internet Services", IEICE Trans. Commun., vol. e86-b, No. 2, Feb. 2003, pp. 542-552.

Sultan, et al., "Migratory TCP: Connection Migration for Service Continuity," in the Internet Proceedings 22nd Intl. Conference on Distributed Computing Systems; Jul. 2002; pp. 469-740.

Sultan, et al., "Position Summary: Transport Layer Support for Highly-Available Network Services," Prejdgs. Eith Workshop on Itot Topics in Operating Systems, p. 182; May 2001.

Takahashi, et al., "APE: Fast and Secure Active Networking Architecture for Active Packet Editing," 2002 IEEE Open Architectures and Network Programming Proceedures; (Open ARCH 2002); Jun. 2002; pp. 104-113.

Uga, et al., "A High-Speed Packet Classification Using TCAM," IEICE Trans. On Communications vol. e85-b No. 9 Sep. 2002.

Vadim, "On Virtual Data Centers and Their Operating Environments", at <<http://www.hpl.hp.com/techreports/2001/HPL-2001-44.html>>, Mar. 8, 2001, pp. 1-20.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.

Wang, et al., "Layer-4 Service Differentiation and Resource Isolation," Proceedings of the Eightht IEEE Real-Time and Embedded Technology and Application Symposium: Sep. 2002; 12 pages.

Araki, "Linux Security Diary, Use VLAN in Linux", Linux Japan, Itsutsubashi Research Co., ltd., vol. 3, No. 11, Nov. 1, 2008, pp. 110-113.

Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

Menezes, et al., "Handbook of Applied Cryptography", CRC Press, 1996, Chapters 8 & 12, pp. 283-319 and 489-541.

Translated copy of the Japanese Office Action mailed on Jan. 26, 2007 for Japanese Patent Application No. 2001-326848, a counterpart foreign application of U.S. Patent No. 6,886,038.

Translated copy of the Japanese Office Action mailed on Dec. 14, 2007 for Japanese Patent Application No. 2001-326848, a counterpart foreign application of U.S. Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Meader, P., "Build Distrubuted Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

Tofts, C., "HOLOS - A Simulation and Multi Mathematical Modeling Tool," Hewlett-Packard Company, 2001, http://www.hpl.hp.com/techreports/2001/HPL-2001-276.pdf.

PCT Intl Search Report and Written Opinion for Application No. PCT/US2006/038856, dated Feb. 20, 2007, 9 pgs.

Burns, et al., "Allocation and Data Placement Using Virtual Contiguity", pp. 1-6, published Feb. 6, 2001.

Chunxiao, et al, Using XML Schema to Configure Mobile E-Commerce Transaction Model:, Applications of the Computer Systems, No. 2, Feb. 28, 2002, pp. 8-11.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx, Published Nov. 15, 2004.

Dekhil, et al., "Generalized Policy Model for Application and Service Management", Hewlett-Packard Laboratories, Software Technology Lab, 3 pages, Published 1999, http://www.policy-workshop.org/1999/policy-99/pdf/17b-dekhil.pdf, retrieved on Jan. 15, 2009.

Garschhammer, et al., "Towards generic Service Management Concepts A Service Model Based Approach", 14 pages, May, 2001.

"Integrated Secruity Management", OpenPMF(Policy Management Framework), 2 pages, cited in a related matter's search report dated Mar. 8, 2006.

Kahn, "Report on DIMAC Workshop on Trust Management", retrieved on May 19, 2005 from <<http://web.archive.org/web/19970603132755/www.jya.com/dimacs.txt>>, Sep. 30-Oct. 2, 1996, 5 pages.

Lee, et al., "Community Services: A Toolkit for Rapid Deployment of Network Services", Proceedings of the IEEE International Conference on Cluster Computing, Cluster 2002, IEEE, 2002, 4 pages.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

"System Definition Model," Windows Server System Home, http://www.microsoft.com/windowsserversystem/dsi/sdm.mspx, published Dec. 15, 2003.

Search Report from related U.S. Appl. No. 11/427,041, dated Mar. 8, 2006.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

* cited by examiner

US 7,606,898 B1

SYSTEM AND METHOD FOR DISTRIBUTED MANAGEMENT OF SHARED COMPUTERS

TECHNICAL FIELD

This invention relates to computer system management. More particularly, the invention relates to the distributed management of shared computers.

BACKGROUND OF THE INVENTION

The Internet and its use have expanded greatly in recent years, and this expansion is expected to continue. One significant way in which the Internet is used is the World Wide Web (also referred to as the "web"), which is a collection of documents (referred to as "web pages") that users can view or otherwise render and which typically include links to one or more other pages that the user can access. Many businesses and individuals have created a presence on the web, typically consisting of one or more web pages describing themselves, describing their products or services, identifying other information of interest, allowing goods or services to be purchased, etc.

Web pages are typically made available on the web via one or more web servers, a process referred to as "hosting" the web pages. Sometimes these web pages are freely available to anyone that requests to view them (e.g., a company's advertisements) and other times access to the web pages is restricted (e.g., a password may be necessary to access the web pages). Given the large number of people that may be requesting to view the web pages (especially in light of the global accessibility to the web), a large number of servers may be necessary to adequately host the web pages (e.g., the same web page can be hosted on multiple servers to increase the number of people that can access the web page concurrently). Additionally, because the web is geographically distributed and has non-uniformity of access, it is often desirable to distribute servers to diverse remote locations in order to minimize access times for people in diverse locations of the world. Furthermore, people tend to view web pages around the clock (again, especially in light of the global accessibility to the web), so servers hosting web pages should be kept functional 24 hours per day.

Managing a large number of servers, however, can be difficult. A reliable power supply is necessary to ensure the servers can run. Physical security is necessary to ensure that a thief or other mischievous person does not attempt to damage or steal the servers. A reliable Internet connection is required to ensure that the access requests will reach the servers. A proper operating environment (e.g., temperature, humidity, etc.) is required to ensure that the servers operate properly. Thus, "co-location facilities" have evolved which assist companies in handling these difficulties.

A co-location facility refers to a complex that can house multiple servers. The co-location facility typically provides a reliable Internet connection, a reliable power supply, and proper operating environment. The co-location facility also typically includes multiple secure areas (e.g., cages) into which different companies can situate their servers. The collection of servers that a particular company situates at the co-location facility is referred to as a "server cluster", even though in fact there may only be a single server at any individual co-location facility. The particular company is then responsible for managing the operation of the servers in their server cluster.

Such co-location facilities, however, also present problems. One problem is data security. Different companies (even competitors) can have server clusters at the same co-location facility. Care is required, in such circumstances, to ensure that data received from the Internet (or sent by a server in the server cluster) that is intended for one company is not routed to a server of another company situated at the co-location facility.

An additional problem is the management of the servers once they are placed in the co-location facility. Currently, a system administrator from a company is able to contact a co-location facility administrator (typically by telephone) and ask him or her to reset a particular server (typically by pressing a hardware reset button on the server, or powering off then powering on the server) in the event of a failure of (or other problem with) the server. This limited reset-only ability provides very little management functionality to the company. Alternatively, the system administrator from the company can physically travel to the co-location facility him/herself and attend to the faulty server. Unfortunately, a significant amount of time can be wasted by the system administrator in traveling to the co-location facility to attend to a server. Thus, it would be beneficial to have an improved way to manage remote server computers at a co-location facility.

Another problem concerns the enforcement of the rights of both the operators of the servers in the co-location facility and the operators of the web service hosted on those servers. The operators of the servers need to be able to maintain their rights (e.g., re-possessing areas of the facility where servers are stored), even though the servers are owned by the operators of the web service. Additionally, the operators of the web service need to be assured that their data remains secure.

The invention described below addresses these disadvantages, improving the distributed management of shared computers in co-location facilities.

SUMMARY OF THE INVENTION

Distributed management of shared computers is described herein.

According to one aspect, a multi-tiered management architecture is employed including an application development tier, an application operations tier, and a cluster operations tier. In the application development tier, applications are developed for execution on one or more server computers. In the application operations tier, execution of the applications is managed and sub-boundaries within a cluster of servers at a co-location facility may be established. In the cluster operations tier, operation of the server computers is managed without concern for what applications are executing on the one or more server computers, and server cluster boundaries at the co-location facility may be established.

According to another aspect, a co-location facility includes multiple server clusters, each corresponding to a different customer. For each server cluster, a cluster operations management console is implemented locally at the co-location facility to manage hardware operations of the cluster, and an application operations management console is implemented at a location remote from the co-location facility to manage software operations of the cluster. In the event of a hardware failure, the cluster operations management console takes corrective action (e.g., notifying an administrator at the co-location facility or attempting to correct the failure itself). In the event of a software failure, the application operations management console takes corrective action (e.g., notifying one of the customer's administrators or attempting to correct the failure itself).

According to another aspect, boundaries of a server cluster are established by a cluster operations management console. Establishment of the boundaries ensures that data is routed only to nodes within the server cluster, and not to other nodes at the co-location facility that are not part of the server cluster. Further sub-boundaries within a server cluster may be established by an application operations management console to ensure data is routed only to particular nodes within the server cluster.

According to another aspect, rights to multiple server computers to be located at a co-location facility are sold to a customer and a multiple-tiered management scheme is enforced on the server computers. According to the multiple-tiered management scheme, hardware operation of the server computers is managed locally at the co-location facility whereas software operation of the server computers is managed from a location remote from the co-location facility. The server computers can be either sold to the customer or leased to the customer.

According to another aspect, a landlord/tenant relationship is created using one or more server computers at a co-location facility. The operator of the co-location facility supplies the facility as well as the servers (and thus can be viewed as a "landlord"), while customers of the facility lease the use of the facility as well as servers at that facility (and thus can be viewed as "tenants"). This landlord/tenant relationship allows the landlord to establish clusters of computers for different tenants and establish boundaries between clusters so that a tenant's data does not pass beyond its cluster (and to another tenant's cluster). Additionally, encryption is employed in various manners to assure the tenant that information stored at the servers it leases cannot be viewed by anyone else, even if the tenant terminates its lease or returns to the landlord one of the servers it is leasing.

According to another aspect, a multi-tiered management architecture is employed in managing computers that are not part of a co-location facility. This multi-tiered architecture is used for managing computers (whether server computers or otherwise) in a variety of settings, such as businesses, homes, etc.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
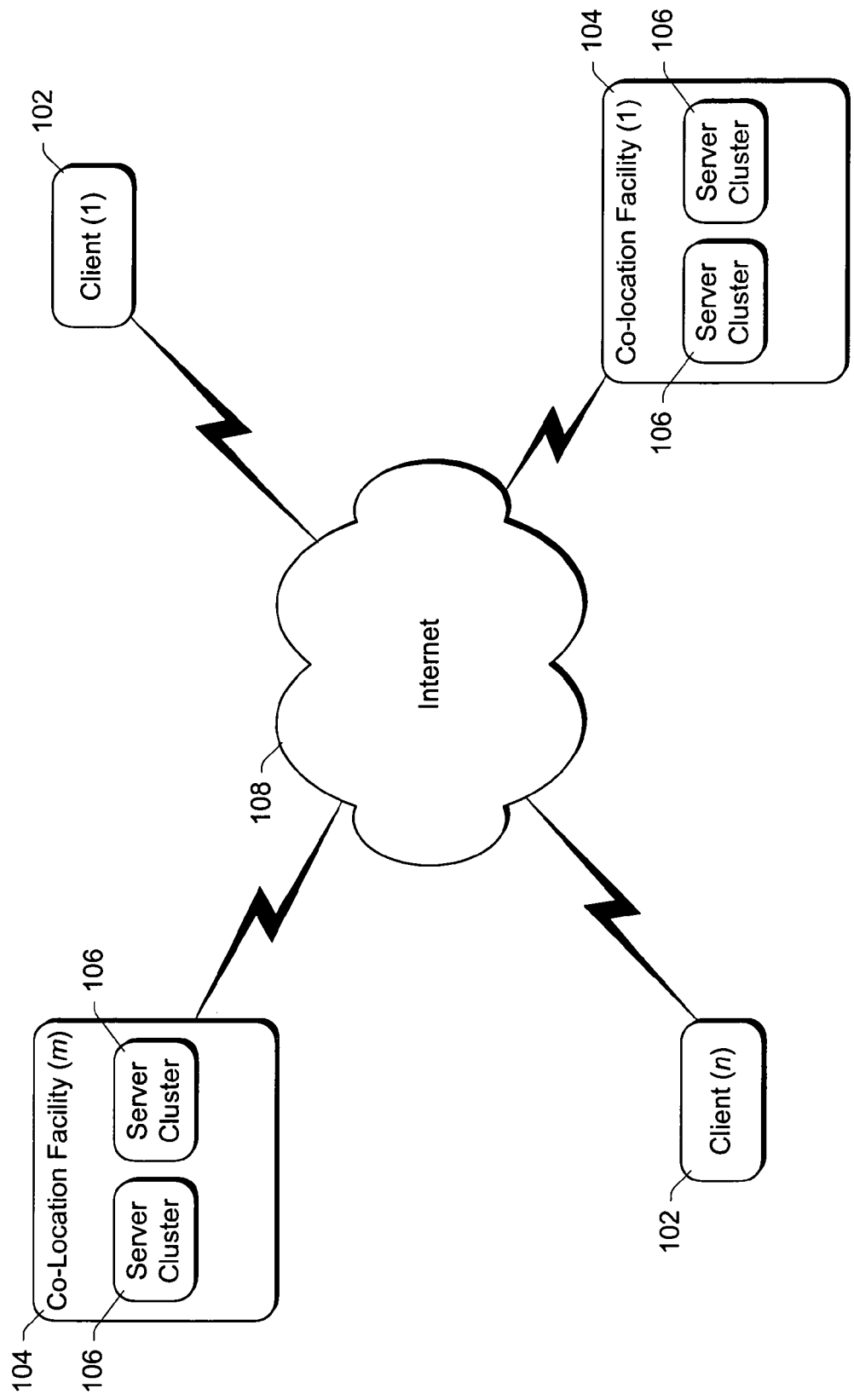
FIG. 1 shows a client/server network system and environment such as may be used with certain embodiments of the invention.

FIG. 1 shows a client/server network system and environment such as may be used with certain embodiments of the invention. Generally, the system includes multiple (n) client computers 102 and multiple (m) co-location facilities 104 each including multiple clusters of server computers (server clusters) 106. The servers and client computers communicate with each other over a data communications network 108. The communications network in FIG. 1 comprises a public network 108 such as the Internet. Other types of communications networks might also be used, in addition to or in place of the Internet, including local area networks (LANs), wide area networks (WANs), etc. Data communications network 108 can be implemented in any of a variety of different manners, including wired and/or wireless communications media.

Communication over network 108 can be carried out using any of a wide variety of communications protocols. In one implementation, client computers 102 and server computers in clusters 106 can communicate with one another using the Hypertext Transfer Protocol (HTTP), in which web pages are hosted by the server computers and written in a markup language, such as the Hypertext Markup Language (HTML) or the eXtensible Markup Language (XML).

In the discussions herein, embodiments of the invention are described primarily with reference to implementation at a co-location facility (such as facility 104). The invention, however, is not limited to such implementations and can be used for distributed management in any of a wide variety of situations. For example, in situations where all of the servers at a facility are owned or leased to the same customer, in situations where a single computing device (e.g., a server or client) is being managed, in situations where computers (whether servers or otherwise) in a business or home environment are being managed, etc.

In the discussion herein, embodiments of the invention are described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, Internet appliances, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs) or programmable logic devices (PLDs).

Figure 2:
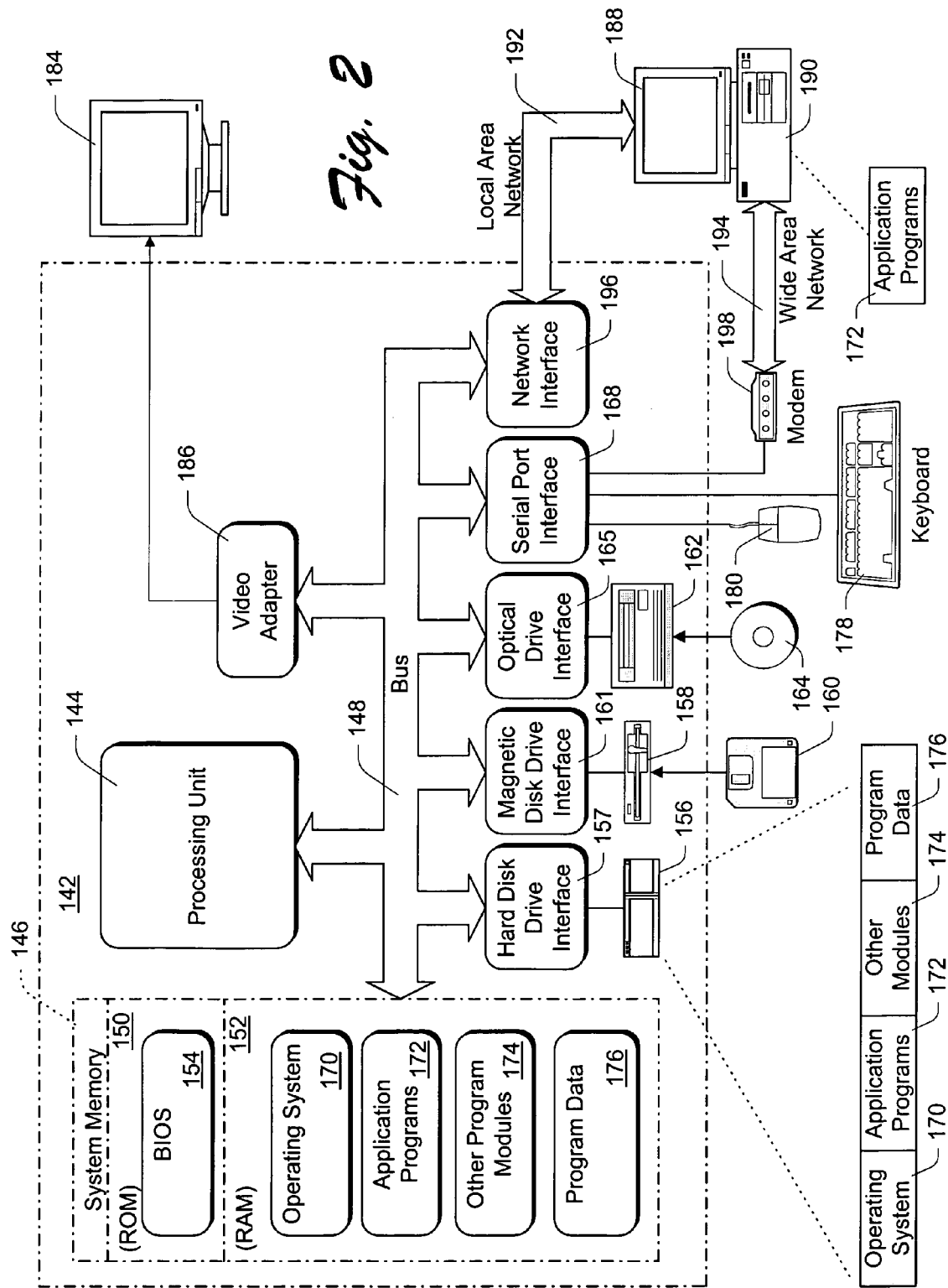
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of a client computer 102 of FIG. 1, a computer or node in a co-location facility 104 of FIG. 1 or other location (e.g., node 248 of FIG. 5 below), or a local or remote management console as discussed in more detail below.

Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, up, is stored in ROM 150.

Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 optionally operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other component for establishing communications over the wide area network 194, such as the Internet. The modem 198, which may be internal or external, is connected to the system bus 148 via an interface (e.g., a serial port interface 168). In a networked environment, program modules depicted relative to the personal computer 142, or portions thereof, may be stored in the remote memory storage device. It is to be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
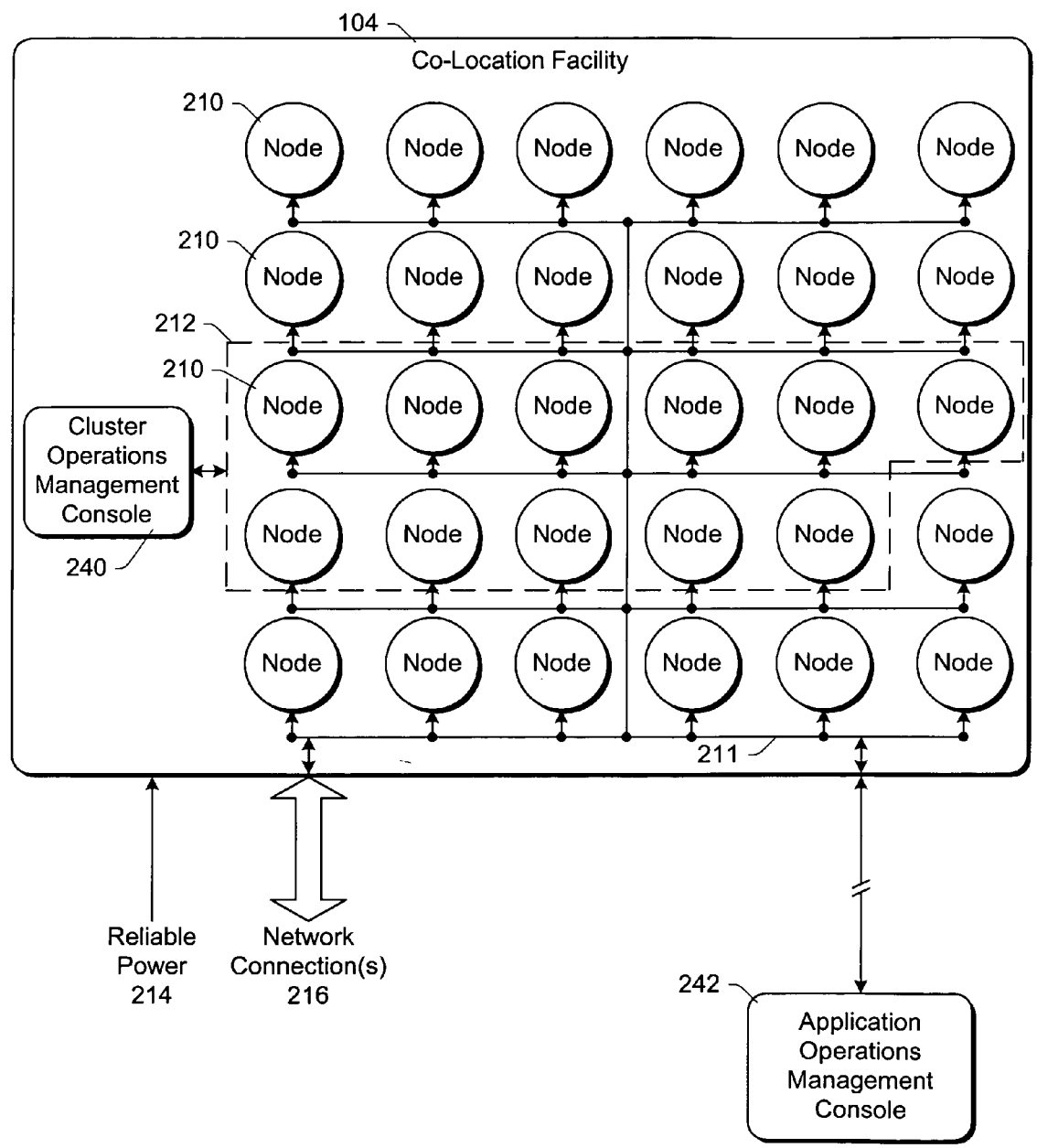
FIG. 3 is a block diagram illustrating an exemplary co-location facility in more detail.

FIG. 3 is a block diagram illustrating an exemplary co-location facility in more detail. Co-location facility 104 is illustrated including multiple nodes (also referred to as server computers) 210. Co-location facility 104 can include any number of nodes 210, and can easily include an amount of nodes numbering into the thousands.

The nodes 210 are grouped together in clusters, referred to as server clusters (or node clusters). For ease of explanation and to avoid cluttering the drawings, only a single cluster 212 is illustrated in FIG. 3. Each server cluster includes nodes 210 that correspond to a particular customer of co-location facility 104. The nodes 210 of a server cluster are physically isolated from the nodes 210 of other server clusters. This physical isolation can take different forms, such as separate locked cages or separate rooms at co-location facility 104. Physically isolating server clusters ensures customers of co-location facility 104 that only they can physically access their nodes (other customers cannot). Alternatively, server clusters may be logically, but not physically, isolated for each other (e.g., using cluster boundaries as discussed in more detail below).

A landlord/tenant relationship (also referred to as a lessor/lessee relationship) can also be established based on the nodes 210. The owner (and/or operator) of co-location facility 104 owns (or otherwise has rights to) the individual nodes 210, and thus can be viewed as a "landlord". The customers of co-location facility 104 lease the nodes 210 from the landlord, and thus can be viewed as a "tenant". The landlord is typically not concerned with what types of data or programs are being stored at the nodes 210 by the tenant, but does impose boundaries on the clusters that prevent nodes 210 from different clusters from communicating with one another, as discussed in more detail below.

The landlord/tenant relationship is discussed herein primarily with reference to only two levels: the landlord and the tenant. However, in alternate embodiments this relationship can be expanded to any number of levels. For example, the landlord may share its management responsibilities with one or more sub-landlords (each of which would have certain managerial control over one or more nodes 210), and the tenant may similarly share its management responsibilities with one or more sub-tenants (each of which would have certain managerial control over one or more nodes 210).

Although physically isolated, nodes 210 of different clusters are often physically coupled to the same transport medium (or media) 211 that enables access to network connection(s) 216, and possibly application operations management console 242, discussed in more detail below. This transport medium can be wired or wireless.

As each node 210 can be coupled to a shared transport medium 211, each node 210 is configurable to restrict which other nodes 210 data can be sent to or received from. Given that a number of different nodes 210 may be included in a tenant's server cluster, the tenant may want to be able to pass data between different nodes 210 within the cluster for processing, storage, etc. However, the tenant will typically not want data to be passed to other nodes 210 that are not in the server cluster. Configuring each node 210 in the cluster to restrict which other nodes 210 data can be sent to or received from allows a boundary for the server cluster to be established and enforced. Establishment and enforcement of such server cluster boundaries prevents tenant data from being erroneously or improperly forwarded to a node that is not part of the cluster.

These initial boundaries established by the landlord prevent communication between nodes 210 of different tenants, thereby ensuring that each tenant's data can be passed to other nodes 210 of that tenant. The tenant itself may also further define sub-boundaries within its cluster, establishing sub-clusters of nodes 210 that data cannot be communicated out of (or in to) either to or from other nodes in the cluster. The tenant is able to add, modify, remove, etc. such sub-cluster boundaries at will, but only within the boundaries defined by the landlord (that is, the cluster boundaries). Thus, the tenant is not able to alter boundaries in a manner that would allow communication to or from a node 210 to extend to another node 210 that is not within the same cluster.

Co-location facility 104 supplies reliable power 214 and reliable network connection(s) 216 to each of the nodes 210. Power 214 and network connection(s) 216 are shared by all of the nodes 210, although alternatively separate power 214 and network connection(s) 216 may be supplied to nodes 210 or groupings (e.g., clusters) of nodes. Any of a wide variety of conventional mechanisms for supplying reliable power can be used to supply reliable power 214, such as power received from a public utility company along with backup generators in the event of power failures, redundant generators, batteries, fuel cells, or other power storage mechanisms, etc. Similarly, any of a wide variety of conventional mechanisms for supplying a reliable network connection can be used to supply network connection(s) 216, such as redundant connection transport media, different types of connection media, different access points (e.g., different Internet access points, different Internet service providers (ISPs), etc.).

In certain embodiments, nodes 210 are leased or sold to customers by the operator or owner of co-location facility 104 along with the space (e.g., locked cages) and service (e.g., access to reliable power 214 and network connection(s) 216) at facility 104. In other embodiments, space and service at facility 104 may be leased to customers while one or more nodes are supplied by the customer.

Figure 4:
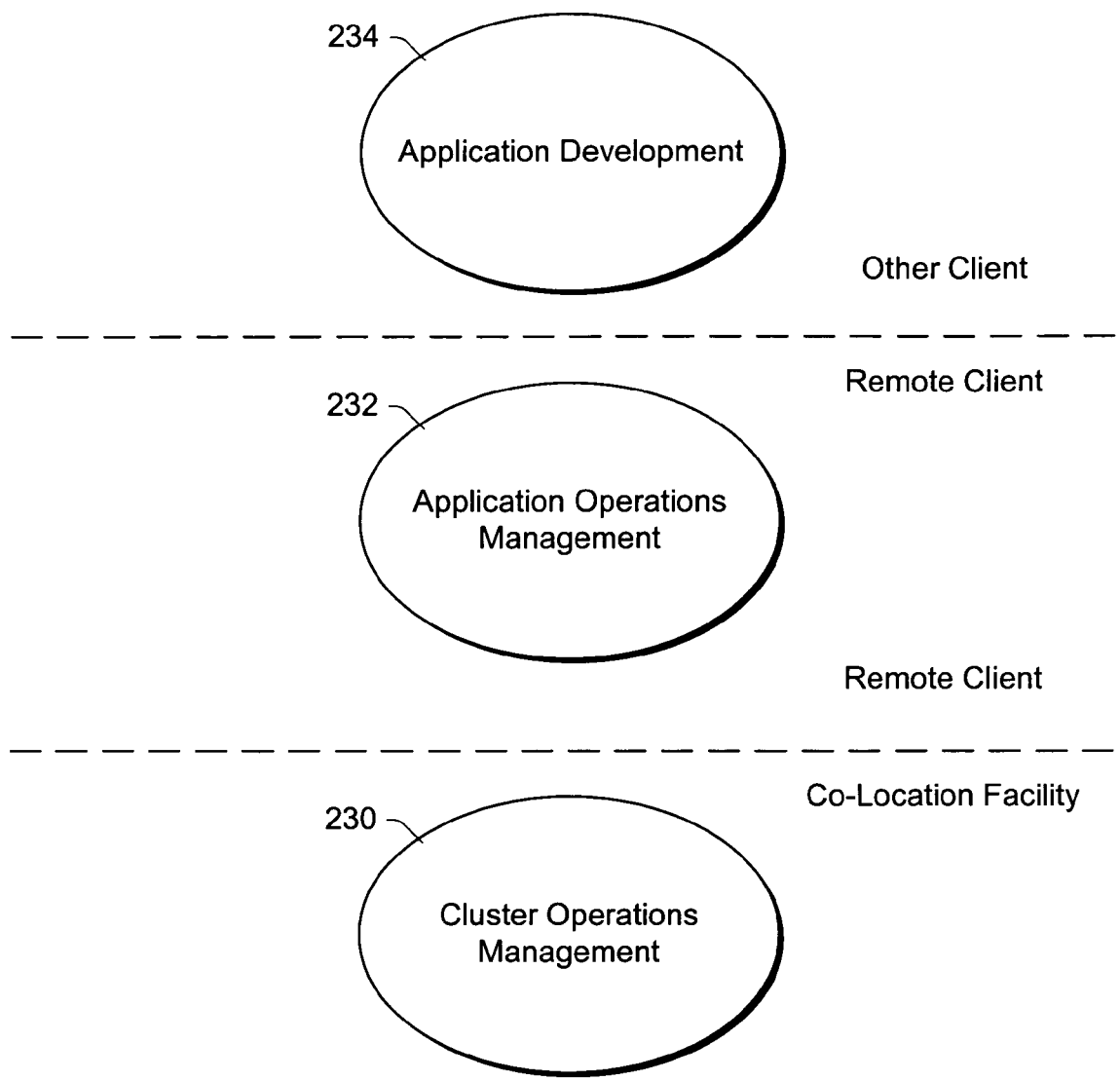
FIG. 4 is a block diagram illustrating an exemplary multi-tiered management architecture.

Management of each node 210 is carried out in a multiple-tiered manner. FIG. 4 is a block diagram illustrating an exemplary multi-tiered management architecture. The multi-tiered architecture includes three tiers: a cluster operations management tier 230, an application operations management tier 232, and an application development tier 234. Cluster operations management tier 230 is implemented locally at the same location as the server(s) being managed (e.g., at a co-location facility) and involves managing the hardware operations of the server(s). In the illustrated example, cluster operations management tier 230 is not concerned with what software components are executing on the nodes 210, but only with the continuing operation of the hardware of nodes 210 and establishing any boundaries between clusters of nodes.

The application operations management tier 232, on the other hand, is implemented at a remote location other than where the server(s) being managed are located (e.g., other than the co-location facility), but from a client computer that is still communicatively coupled to the server(s). The application operations management tier 232 involves managing the software operations of the server(s) and defining sub-boundaries within server clusters. The client can be coupled to the server(s) in any of a variety of manners, such as via the Internet or via a dedicated (e.g., dial-up) connection. The client can be coupled continually to the server(s), or alternatively sporadically (e.g., only when needed for management purposes).

The application development tier 234 is implemented on another client computer at a location other than the server(s) (e.g., other than at the co-location facility) and involves development of software components or engines for execution on the server(s). Alternatively, current software on a node 210 at co-location facility 104 could be accessed by a remote client to develop additional software components or engines for the node. Although the client at which application development tier 234 is implemented is typically a different client than that at which application operations management tier 232 is implemented, tiers 232 and 234 could be implemented (at least in part) on the same client.

Although only three tiers are illustrated in FIG. 4, alternatively the multi-tiered architecture could include different numbers of tiers. For example, the application operations management tier may be separated into two tiers, each having different (or overlapping) responsibilities, resulting in a 4-tiered architecture. The management at these tiers may occur from the same place (e.g., a single application operations management console may be shared), or alternatively from different places (e.g., two different operations management consoles).

Returning to FIG. 3, co-location facility 104 includes a cluster operations management console for each server cluster. In the example of FIG. 3, cluster operations management console 240 corresponds to cluster 212. Cluster operations management console 240 implements cluster operations management tier 230 (FIG. 4) for cluster 212 and is responsible for managing the hardware operations of nodes 210 in cluster 212. Cluster operations management console 240 monitors the hardware in cluster 212 and attempts to identify hardware failures. Any of a wide variety of hardware failures can be monitored for, such as processor failures, bus failures, memory failures, etc. Hardware operations can be monitored in any of a variety of manners, such as cluster operations management console 240 sending test messages or control signals to the nodes 210 that require the use of particular hardware in order to respond (no response or an incorrect response indicates failure), having messages or control signals that require the use of particular hardware to generate periodically sent by nodes 210 to cluster operations management console 240 (not receiving such a message or control signal within a specified amount of time indicates failure), etc. Alternatively, cluster operations management console 240 may make no attempt to identify what type of hardware failure has occurred, but rather simply that a failure has occurred.

Once a hardware failure is detected, cluster operations management console 240 acts to correct the failure. The action taken by cluster operations management console 240 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to physically correct the problem (e.g., reboot the node, activate another backup node to take its place, etc.).

Cluster operations management console 240 also establishes cluster boundaries within co-location facility 104. The cluster boundaries established by console 240 prevent nodes 210 in one cluster (e.g., cluster 212) from communicating with nodes in another cluster (e.g., any node not in cluster 212), while at the same time not interfering with the ability of nodes 210 within a cluster from communicating with other nodes within that cluster. These boundaries provide security for the tenants' data, allowing them to know that their data cannot be communicated to other tenants' nodes 210 at facility 104 even though network connection 216 may be shared by the tenants.

In the illustrated example, each cluster of co-location facility 104 includes a dedicated cluster operations management console. Alternatively, a single cluster operations management console may correspond to, and manage hardware operations of multiple server clusters. According to another alternative, multiple cluster operations management consoles may correspond to, and manage hardware operations of, a single server cluster. Such multiple consoles can manage a single server cluster in a shared manner, or one console may operate as a backup for another console (e.g., providing increased reliability through redundancy, to allow for maintenance, etc.).

An application operations management console 242 is also communicatively coupled to co-location facility 104. Application operations management console 242 is located at a location remote from co-location facility 104 (that is, not within co-location facility 104), typically being located at the offices of the customer. A different application operations management console 242 corresponds to each server cluster of co-location facility 104, although alternatively multiple consoles 242 may correspond to a single server cluster, or a single console 242 may correspond to multiple server clusters. Application operations management console 242 implements application operations management tier 232 (FIG. 4) for cluster 212 and is responsible for managing the software operations of nodes 210 in cluster 212 as well as securing sub-boundaries within cluster 212.

Application operations management console 242 monitors the software in cluster 212 and attempts to identify software failures. Any of a wide variety of software failures can be monitored for, such as application processes or threads that are "hung" or otherwise non-responsive, an error in execution of application processes or threads, etc. Software operations can be monitored in any of a variety of manners (similar to the monitoring of hardware operations discussed above), such as application operations management console 242 sending test messages or control signals to particular processes or threads executing on the nodes 210 that require the use of particular routines in order to respond (no response or an incorrect response indicates failure), having messages or control signals that require the use of particular software routines to generate periodically sent by processes or threads executing on nodes 210 to application operations management console 242 (not receiving such a message or control signal within a specified amount of time indicates failure), etc. Alternatively, application operations management console 242 may make no attempt to identify what type of software failure has occurred, but rather simply that a failure has occurred.

Once a software failure is detected, application operations management console 242 acts to correct the failure. The action taken by application operations management console 242 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to correct the problem (e.g., reboot the node, re-load the software component or engine image, terminate and re-execute the process, etc.).

Thus, the management of a node 210 is distributed across multiple managers, regardless of the number of other nodes (if any) situated at the same location as the node 210. The multi-tiered management allows the hardware operations management to be separated from the application operations management, allowing two different consoles (each under the control of a different entity) to share the management responsibility for the node.

The multi-tiered management architecture can also be used in other situations to manage one or more computers from one or more remote locations, even if the computers are not part of a co-location facility. By way of example, a small business may purchase their own computers, but hire another company to manage the hardware operations of the computers, and possibly yet another company to manage the software operations of the computers.

In this example, the small business (the owner of the computers) is a first management tier. The owner then leases the computers to the outsourced hardware operator, which is the second management tier. The hardware operator can manage the hardware operation from a control console, either located locally at the small business along with the computers being managed or alternatively at some remote location, analogous to cluster operations management console 240. The hardware operator then leases the computers to an outsourced software operator, which is the third management tier. The software operator can manage the software operation from a control console, either located locally at the small business along with the computers being managed or alternatively at some remote location, analogous to application operations management console 242. The software operator then leases the computers back to their owner, so the owner becomes the "user" of the computers, which is the fourth management tier. During normal operation, the computer owner occupies this fourth management tier. However, the computer owner can exercise its first management tier rights to sever one or both of the leases to the software operator and the hardware operator, such as when the computer owner desires to change software or hardware operators.

Figure 5:
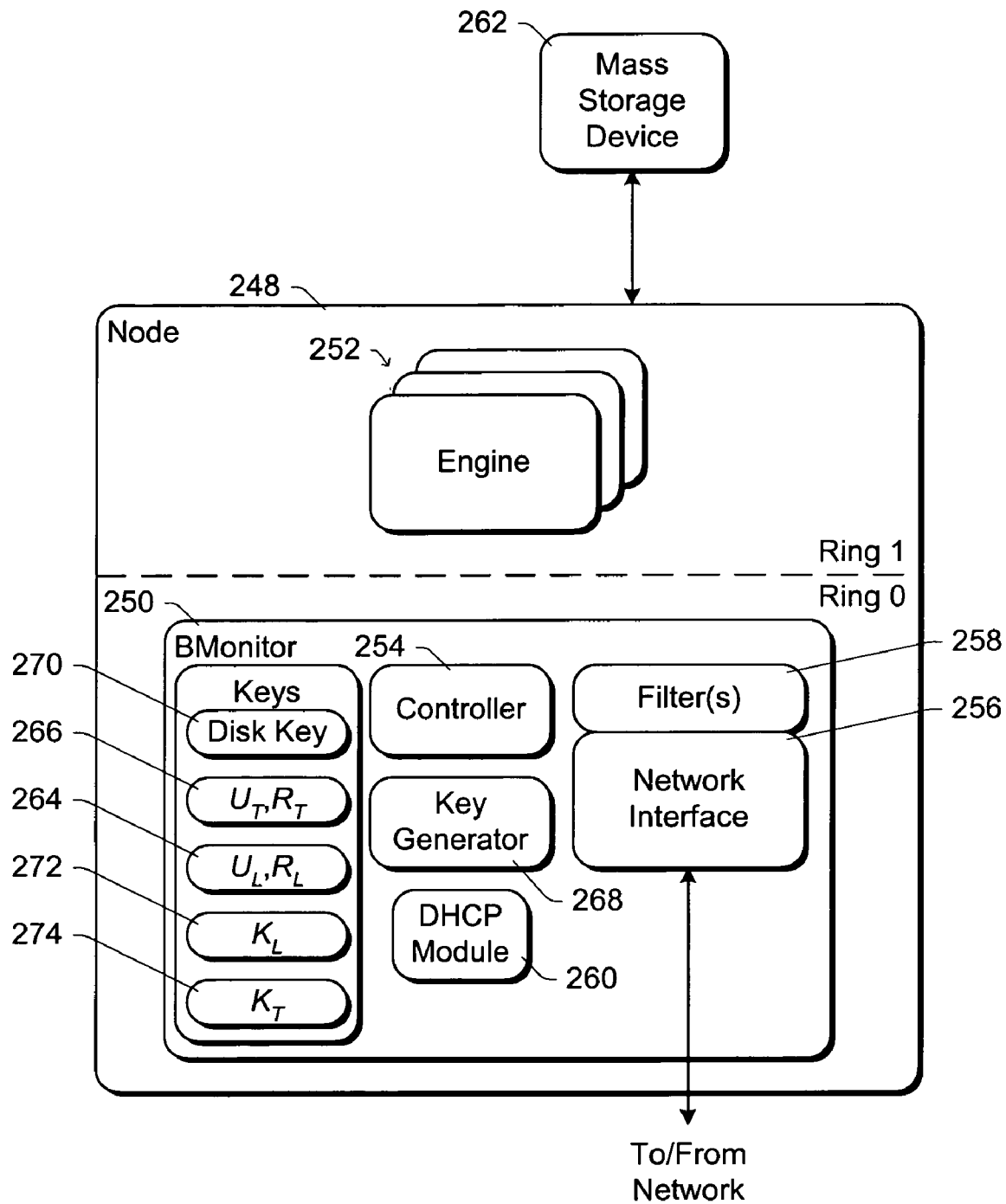
FIG. 5 is a block diagram illustrating an exemplary node in more detail in accordance with certain embodiments of the invention.

FIG. 5 is a block diagram illustrating an exemplary node in more detail in accordance with certain embodiments of the invention. Node 248 is an exemplary node managed by other devices (e.g., consoles 240 and 242 of FIG. 3) external to the node. Node 248 can be a node 210 of FIG. 3, or alternatively a node at another location (e.g., a computer in a business or home environment). Node 248 includes a monitor 250, referred to as the "BMonitor", and a plurality of software components or engines 252, and is coupled to (or alternatively incorporates) a mass storage device 262. In the illustrated example, node 248 is a server computer having a processor(s) that supports multiple privilege levels (e.g., rings in an x86 architecture processor). In the illustrated example, these privilege levels are referred to as rings, although alternate implementations using different processor architectures may use different nomenclature. The multiple rings provide a set of prioritized levels that software can execute at, often including 4 levels (Rings 0, 1, 2, and 3). Ring 0 is typically referred to as the most privileged ring. Software processes executing in Ring 0 can typically access more features (e.g., instructions) than processes executing in less privileged Rings. Furthermore, a processor executing in a particular Ring cannot alter code or data in a higher priority ring. In the illustrated example, BMonitor 250 executes in Ring 0, while engines 252 execute in Ring 1 (or alternatively Rings 2 and/or 3). Thus, the code or data of BMonitor 250 (executing in Ring 0) cannot be altered directly by engines 252 (executing in Ring 1). Rather, any such alterations would have to be made by an engine 252 requesting BMonitor 250 to make the alteration (e.g., by sending a message to BMonitor 250, invoking a function of BMonitor 250, etc.). Implementing BMonitor 250 in Ring 0 protects BMonitor 250 from a rogue or malicious engine 252 that tries to bypass any restrictions imposed by BMonitor 250.

BMonitor 250 is the fundamental control module of node 248—it controls (and optionally includes) both the network interface card and the memory manager. By controlling the network interface card (which may be separate from BMonitor 250, or alternatively BMonitor 250 may be incorporated on the network interface card), BMonitor 250 can control data received by and sent by node 248. By controlling the memory manager, BMonitor 250 controls the allocation of memory to engines 252 executing in node 248 and thus can assist in preventing rogue or malicious engines from interfering with the operation of BMonitor 250.

Although various aspects of node 248 may be under control of BMonitor 250 (e.g., the network interface card), BMonitor 250 still makes at least part of such functionality available to engines 252 executing on the node 248. BMonitor 250 provides an interface (e.g., via controller 254 discussed in more detail below) via which engines 252 can request access to the functionality, such as to send data out to another node 248 or to the Internet. These requests can take any of a variety of forms, such as sending messages, calling a function, etc.

BMonitor 250 includes controller 254, network interface 256, one or more filters 258, and a Distributed Host Control Protocol (DHCP) module 260. Network interface 256 provides the interface between node 248 and the network (e.g., network connections 126 of FIG. 3) via the internal transport medium 211 of co-location facility 104. Filters 258 identify other nodes 248 (and/or other sources or targets (e.g., coupled to Internet 108 of FIG. 1) that data can (or alternatively cannot) be sent to and/or received from. The nodes or other sources/targets can be identified in any of a wide variety of manners, such as by network address (e.g., Internet Protocol (IP) address), some other globally unique identifier, a locally unique identifier (e.g., a numbering scheme proprietary or local to co-location facility 104), etc.

Filters 258 can fully restrict access to a node (e.g., no data can be received from or sent to the node), or partially restrict access to a node. Partial access restriction can take different forms. For example, a node may be restricted so that data can be received from the node but not sent to the node (or vice versa). By way of another example, a node may be restricted so that only certain types of data (e.g., communications in accordance with certain protocols, such as HTTP) can be received from and/or sent to the node. Filtering based on particular types of data can be implemented in different manners, such as by communicating data in packets with header information that indicate the type of data included in the packet.

Filters 258 can be added by application operations management console 242 or cluster operations management console 240. In the illustrated example, filters added by cluster operations management console 240 (to establish cluster boundaries) restrict full access to nodes (e.g., any access to another node can be prevented) whereas filters added by application operations management console 242 (to establish sub-boundaries within a cluster) can restrict either full access to nodes or partial access.

Controller 254 also imposes some restrictions on what filters can be added to filters 258. In the illustrated example, controller 254 allows cluster operations management console 240 to add any filters it desires (which will define the boundaries of the cluster). However, controller 254 restricts application operations management console 242 to adding only filters that are at least as restrictive as those added by console 240. If console 242 attempts to add a filter that is less restrictive than those added by console 240 (in which case the sub-boundary may extend beyond the cluster boundaries), controller 254 refuses to add the filter (or alternatively may modify the filter so that it is not less restrictive). By imposing such a restriction, controller 254 can ensure that the sub-boundaries established at the application operations management level do not extend beyond the cluster boundaries established at the cluster operations management level.

Controller 254, using one or more filters 258, operates to restrict data packets sent from node 248 and/or received by node 248. All data intended for an engine 252, or sent by an engine 252, to another node, is passed through network interface 256 and filters 258. Controller 254 applies the filters 258 to the data, comparing the target of the data (e.g., typically identified in a header portion of a packet including the data) to acceptable (and/or restricted) nodes (and/or network addresses) identified in filters 258. If filters 258 indicate that the target of the data is acceptable, then controller 254 allows the data to pass through to the target (either into node 248 or out from node 248). However, if filters 258 indicate that the target of the data is not acceptable, then controller 254 prevents the data from passing through to the target. Controller 254 may return an indication to the source of the data that the data cannot be passed to the target, or may simply ignore or discard the data.

The application of filters 258 to the data by controller 254 allows the boundary restrictions of a server cluster to be imposed. Filters 258 can be programmed (e.g., by application operations management console 242 of FIG. 3) with the node addresses of all the nodes within the server cluster (e.g., cluster 212). Controller 254 then prevents data received from any node not within the server cluster from being passed through to an engine 252, and similarly prevents any data being sent to a node other than one within the server cluster from being sent. Similarly, data received from Internet 108 (FIG. 1) can identify a target node 210 (e.g., by IP address), so that controller 254 of any node other than the target node will prevent the data from being passed through to an engine 252.

DHCP module 260 implements the Distributed Host Control Protocol, allowing BMonitor 250 (and thus node 210) to obtain an IP address from a DHCP server (e.g., cluster operations management console 240 of FIG. 3). During an initialization process for node 210, DHCP module 260 requests an IP address from the DHCP server, which in turn provides the IP address to module 260. Additional information regarding DHCP is available from Microsoft Corporation of Redmond, Wash.

Software engines 252 include any of a wide variety of conventional software components. Examples of engines 252 include an operating system (e.g., Windows NT®), a load balancing server component (e.g., to balance the processing load of multiple nodes 248), a caching server component (e.g., to cache data and/or instructions from another node 248 or received via the Internet), a storage manager component (e.g., to manage storage of data from another node 248 or received via the Internet), etc. In one implementation, each of the engines 252 is a protocol-based engine, communicating with BMonitor 250 and other engines 252 via messages and/or function calls without requiring the engines 252 and BMonitor 250 to be written using the same programming language.

Controller 254 is further responsible for controlling the execution of engines 252. This control can take different forms, including beginning execution of an engine 252, terminating execution of an engine 252, re-loading an image of an engine 252 from a storage device, debugging execution of an engine 252, etc. Controller 254 receives instructions from application operations management console 242 of FIG. 3 regarding which of these control actions to take and when to take them. Thus, the control of engines 252 is actually managed by the remote application operations management console 242, not locally at co-location facility 104. Controller 254 also provides an interface via which application operations management console 242 can identify filters to add (and/or remove) from filter set 258.

Controller 254 also includes an interface via which cluster operations management console 240 of FIG. 3 can communicate commands to controller 254. Different types of hardware operation oriented commands can be communicated to controller 254 by cluster operations management console 240, such as re-booting the node, shutting down the node, placing the node in a low-power state (e.g., in a suspend or standby state), changing cluster boundaries, changing encryption keys, etc.

Controller 254 further provides encryption support for BMonitor 250, allowing data to be stored securely on mass storage device 262 (e.g., a magnetic disk, an optical disk, etc.) and secure communications to occur between node 248 and an operations management console (e.g., console 240 or 242 of FIG. 3). Controller 254 maintains multiple encryption keys, including: one for the landlord (referred to as the "landlord key") which accesses node 248 from cluster operations management console 240, one for the lessee of node 248 (referred to as the "tenant key") which accesses node 248 from application operations management console 242, and keys that BMonitor 250 uses to securely store data on mass storage device 262 (referred to as the "disk key").

BMonitor 250 makes use of public key cryptography to provide secure communications between node 248 and the management consoles (e.g., consoles 240 and 242). Public key cryptography is based on a key pair, including both a public key and a private key, and an encryption algorithm. The encryption algorithm can encrypt data based on the public key such that it cannot be decrypted efficiently without the private key. Thus, communications from the public-key holder can be encrypted using the public key, allowing only the private-key holder to decrypt the communications. Any of a variety of public key cryptography techniques may be used, such as the well-known RSA (Rivest, Shamir, and Adelman) encryption technique. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

BMonitor 250 is initialized to include a public/private key pair for both the landlord and the tenant. These key pairs can be generated by BMonitor 250, or alternatively by some other component and stored within BMonitor 250 (with that other component being trusted to destroy its knowledge of the key pair). As used herein, U refers to a public key and R refers to a private key. The public/private key pair 264 for the landlord is referred to as ($U_L$, $R_L$), and the public/private key pair 266 for the tenant is referred to as ($U_T$, $R_T$). BMonitor 250 makes the public keys $U_L$ and $U_T$ available to the landlord, but keeps the private keys $R_L$ and $R_T$ secret. In the illustrated example, BMonitor 250 never divulges the private keys $R_L$ and $R_T$, so both the landlord and the tenant can be assured that no entity other than the BMonitor 250 can decrypt information that they encrypt using their public keys (e.g., via cluster operations management console 240 and application operations management console 242 of FIG. 3, respectively).

Once the landlord has the public keys $U_L$ and $U_T$, the landlord can assign node 210 to a particular tenant, giving that tenant the public key $U_T$. Use of the public key $U_T$ allows the tenant to encrypt communications to BMonitor 250 that only BMonitor 250 can decrypt (using the private key $R_T$). Although not required, a prudent initial step for the tenant is to request that BMonitor 250 generate a new public/private key pair ($U_T$, $R_T$). In response to such a request, a key generator 268 of BMonitor 250 generates a new public/private key pair in any of a variety of well-known manners, stores the new key pair as key pair 266, and returns the new public key $U_T$ to the tenant. By generating a new key pair, the tenant is assured that no other entity, including the landlord, is aware of the tenant public key $U_T$. Additionally, the tenant may also have new key pairs generated at subsequent times.

BMonitor 250 enforces restrictions on what entities can request new public/private key pairs. The tenant is able to request new tenant public/private key pairs, but is not able to request new landlord public/private key pairs. The landlord, however, can request new landlord public/private key pairs as well as new tenant public/private key pairs. Whenever a request for a new public/private key pair is received, controller 254 verifies the identity of the requestor as the tenant or landlord (e.g., based on a remote log-in procedure, password verification, manner in which the requestor is communicating with or is coupled to node 248, etc.) before generating the new key pair.

In order to ensure bi-directional communication security between BMonitor 250 and the landlord and tenant control devices (e.g., operations management consoles 240 and 242, respectively), the landlord and tenant control devices may also generate (or otherwise be assigned) public/private key pairs. In this situation, consoles 240 and 242 can communicate their respective public keys to BMonitors 250 of nodes 248 they desire (or expect to desire) to communicate with securely. Once the public key of a console is known by a BMonitor 250, the BMonitor 250 can encrypt communications to that console using its public key, thereby preventing any other device except the console having the private key from reading the communication.

BMonitor 250 also maintains a disk key 270, which is generated based on one or more symmetric keys 272 and 274 (symmetric keys refer to secret keys used in secret key cryptography). Disk key 270, also a symmetric key, is used by BMonitor 250 to store information in mass storage device 262. BMonitor 250 keeps disk key 270 secure, using it only to encrypt data node 248 stores on mass storage device 262 and decrypt data node 248 retrieves from mass storage device 262 (thus there is no need for any other entities, including the landlord and tenant, to have knowledge of disk key 270). Alternatively, the landlord or tenant may be informed of disk key 270, or another key on which disk key 270 is based.

Use of disk key 270 ensures that data stored on mass storage device 262 can only be decrypted by the node 248 that encrypted it, and not any other node or device. Thus, for example, if mass storage device 262 were to be removed and attempts made to read the data on device 262, such attempts would be unsuccessful. BMonitor 250 uses disk key 270 to encrypt data to be stored on mass storage device 262 regardless of the source of the data. For example, the data may come from a client device (e.g., client 102 of FIG. 1) used by a customer of the tenant, from an operations management console (e.g., console 242 of FIG. 3), etc.

Disk key 270 is generated based on symmetric keys 272 and 274. As used herein, K refers to a symmetric key, so $K_L$ refers to a landlord symmetric key (key 272) and $K_T$ refers to a tenant symmetric key (key 274). The individual keys 272 and 274 can be generated in any of a wide variety of conventional manners (e.g., based on a random number generator). Disk key 270 is either the $K_L$ key alone, or alternatively is a combination of the $K_L$ and $K_T$ keys. In situations where the node 210 is not currently leased to a tenant, or in which the tenant has not established a $K_T$ key, then controller 254 maintains the $K_L$ key as disk key 270. However, in situations where the node 248 is leased to a tenant that establishes a $K_T$ key, then disk key 270 is a combination of the $K_L$ and $K_T$ keys. The $K_L$ and $K_T$ keys can be combined in a variety of different manners, and in one implementation are combined by using one of the keys to encrypt the other key, with the resultant encrypted key being disk key 270. Thus, the data stored on mass storage device 262 is always encrypted, even if the tenant does not establish a symmetric key $K_T$. Additionally, in situations where the landlord and tenant are aware of their respective keys $K_L$ and $K_T$, then the combination of the keys results in a key that can be used to encrypt the data so that neither the landlord nor the tenant can decrypt it individually.

In the illustrated example, a node 248 does not initially have symmetric keys $K_L$ and $K_T$. When the landlord initializes the node 248, it requests a new key $K_L$ (e.g., via cluster operations management console 240 of FIG. 3), in response to which key generator 268 generates a new key and controller 254 maintains the newly generated key as key 272. Similarly, when a tenant initially leases a node 248 there is not yet a tenant symmetric key $K_T$ for node 248. The tenant can communicate a request for a new key $K_T$ (e.g., via application operations management console 242 of FIG. 3), in response to which key generator 268 generates a new key and controller 254 maintains the newly generated key as key 274. Additionally, each time a new key $K_T$ or $K_L$ is generated, then controller 254 generates a new disk key 270.

Although only a landlord and tenant key ($K_L$ and $K_T$) are illustrated in FIG. 5, alternatively additional symmetric keys (e.g., from a sub-tenant, a sub-landlord, etc.) may be combined to generate disk key 270. For example, if there are three symmetric keys, then they can be combined by encrypting a first of the keys with a second of the keys, and then encrypting the result with the third of the keys to generate disk key 270. Additional symmetric keys may be used, for example, for a sub-tenant(s).

The landlord can also request new public/private key pairs from BMonitor 250, either tenant key pairs or landlord key pairs. Requesting new key pairs can allow, for example, the landlord to re-assign a node 248 from one tenant to another. By way of example, if a tenant no longer desires the node 248 (or does not make required lease payments for the node), then the landlord can communicate with BMonitor 250 (e.g., via console 240 of FIG. 3) to change the public/private key pairs of the tenant (thereby prohibiting any communications from the tenant from being decrypted by the BMonitor 250 because the tenant does not have the new key). Additionally, the landlord may also request a new public/private key pair for the landlord—this may be done at particular intervals or simply whenever the landlord desires a new key (e.g., for safety concerns).

In one implementation, BMonitor 250 discards both the disk key 270 and the landlord symmetric key $K_L$, and generates a new key $K_L$ (and a new disk key 270) each time it generates a new landlord private key $R_L$. By replacing the key $K_L$ and disk key 270 (and keeping no record of the old keys), the landlord can ensure that once it changes its key, any tenant data previously stored at the node 210 cannot be accessed. Thus, care should be taken by the landlord to generate a new public/private key pair only when the landlord wants to prevent the tenant from accessing the data previously stored at node 248.

Additionally, BMonitor 250 may also replace both the disk key 270 and the tenant symmetric key $K_T$, with a newly generated key $K_T$ (and a new disk key 270) each time it generates a new tenant private key $R_T$. This allows the tenant to increase the security of the data being stored at the node 248 because it can change how that data is encrypted as it desires. However, as BMonitor 250 discards the previous key $K_T$ and disk key 270, care should be exercised by the tenant to request a new tenant private key $R_T$ only when the data previously stored at node 210 is no longer needed (e.g., has been backed up elsewhere).

It should be noted that different nodes 248 will typically have different keys (keys 264, 266, and 270). Alternatively, attempts may be made to have multiple nodes use the same key (e.g., key 270). However, in such situations care should be taken to ensure that any communication of the keys (e.g., between nodes 248) is done in a secure manner so that the security is not compromised. For example, additional public/private key pairs may be used by BMonitors 250 of two nodes 248 to securely communicate information between one another.

A leased hardware environment having guaranteed and enforced rights can thus be established. Landlords can lease nodes to multiple different tenants and establish boundaries that prevent nodes leased by different tenants from communicating with one another. Tenants can be assured that nodes they lease are accessible for management only to them, not to others, and that data is stored at the nodes securely so that no one else can access it (even if the tenant leaves or reduces its hardware usages). Furthermore, landlords and tenants are both assured that the landlord can move equipment, change which nodes are assigned to individuals, remove hardware (e.g., mass storage devices), etc. without compromising the secure storage of data by any of the tenants.

Figure 6:
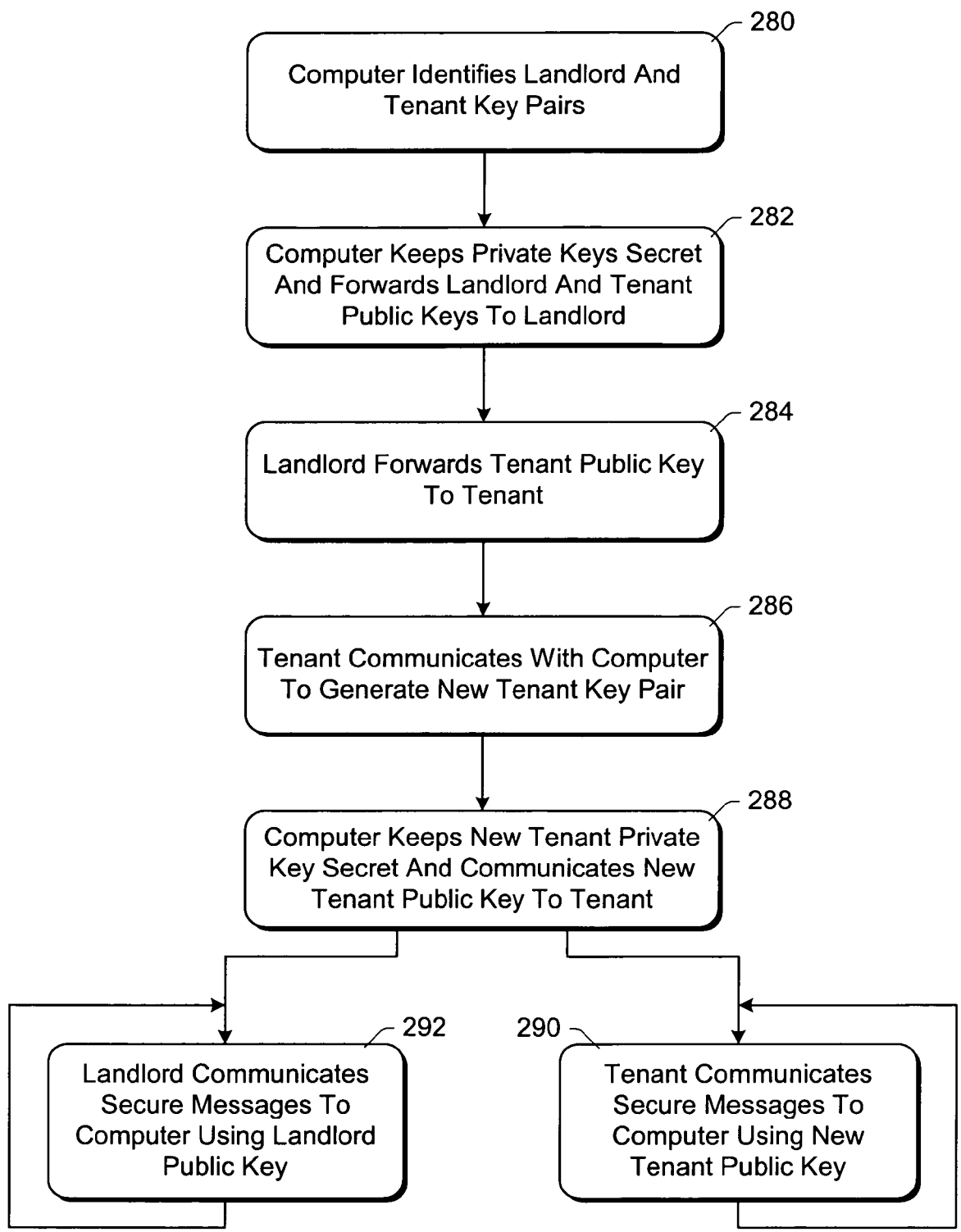
FIG. 6 is a flowchart illustrating an exemplary process for encryption key generation and distribution in accordance with certain embodiments of the invention.

FIG. 6 is a flowchart illustrating an exemplary process for encryption key generation and distribution in accordance with certain embodiments of the invention. Initially, the computer (e.g., a node 248 of FIG. 5) identifies public/private key pairs for both the landlord and the tenant (act 280). This identification can be accessing previously generated key pairs, or alternatively generating a new key pair by the computer itself. The computer keeps both the landlord private key from the landlord key pair and the tenant private key from the tenant key pair secret, but forwards the landlord public key from the landlord key pair and the tenant public key from the tenant key pair to the landlord (act 282). In the illustrated example, the landlord is represented by cluster operations management console 240 of FIG. 3, although alternatively other devices or entities could represent the landlord.

The landlord then forwards the tenant public key to the tenant (act 284). In the illustrated example, the tenant is represented by application operations management console 242 of FIG. 3, although alternatively other devices or entities could represent the tenant. The tenant then communicates with the computer to generate a new tenant key pair (act 286). The computer keeps the tenant private key from the new key pair secret and forwards the tenant public key from the new key pair to the tenant (act 288). The tenant is then able to communicate secure messages (e.g., data, instructions, requests, etc.) to the computer using the new tenant public key (act 290), while the landlord is able to communicate secure messages to the computer using the landlord public key (act 292).

Figure 7:
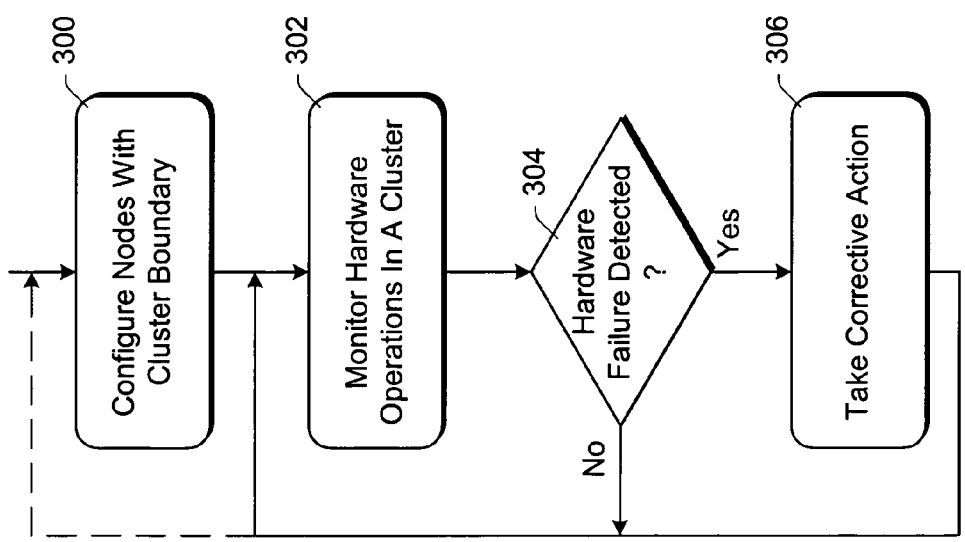
FIG. 7 is a flowchart illustrating an exemplary process for the operation of a cluster operations management console in accordance with certain embodiments of the invention.

FIG. 7 is a flowchart illustrating an exemplary process for the operation of a cluster operations management console in accordance with certain embodiments of the invention. The process of FIG. 7 is implemented by a cluster operations management console at a co-location facility, and may be performed in software.

Initially, the cluster operations management console configures the nodes in the server cluster with the boundaries (if any) of the server cluster (act 300). This configuration is accomplished by the cluster operations management console communicating filters to the nodes in the server cluster(s).

Hardware operations within a server cluster are then continually monitored for a hardware failure (acts 302 and 304). Once a hardware failure is detected, corrective action is taken (act 306) and monitoring of the hardware operation continues. Any of a wide variety of corrective action can be taken, as discussed above. Note that, based on the corrective action (or at other times), the nodes may be re-configured with new cluster boundaries (act 300).

Figure 8:
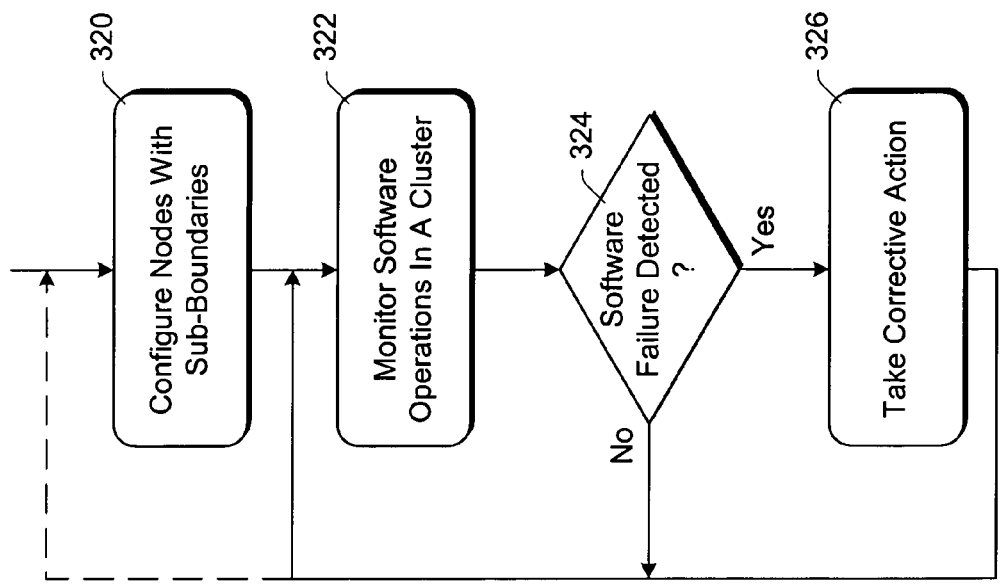
FIG. 8 is a flowchart illustrating an exemplary process for the operation of an application operations management console in accordance with certain embodiments of the invention.

FIG. 8 is a flowchart illustrating an exemplary process for the operation of an application operations management console in accordance with certain embodiments of the invention. The process of FIG. 8 is implemented by an application operations management console located remotely from the co-location facility, and may be performed in software.

Initially, the application operations management console configures the nodes in the server cluster with sub-boundaries (if any) of the server cluster (act 320). This configuration is accomplished by the application operations management console communicating filters to the nodes in the server cluster.

Software operations within the server cluster are then continually monitored until a software failure is detected (acts 322 and 324). This software failure could be failure of a particular software engine (e.g., the engine fails, but the other engines are still running), or alternatively failure of the entire node (e.g., the entire node is hung). Once a software failure is detected, corrective action is taken (act 326) and monitoring of the software operation continues. Any of a wide variety of corrective action can be taken, as discussed above. Note that, based on the corrective action (or at any other time during operation), the server computer may be re-configured with new sub-boundaries (act 320).

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer readable memory having stored thereon a multi-tiered management architecture for implementation by a computer, the management architecture comprising:
    an application development tier at which applications are developed for execution on one or more computers, the application development tier being implemented on a client console communicatively coupled to the one or more computers, wherein the client console is located remotely from a cluster operation tier console and an application operations tier console;
    an application operations tier at which execution of the applications is managed, the application operations tier being implemented on the application operation management console at a location remote from the oneor more computers; and
    a cluster operations tier to manage the operation of the computers without concern for what applications are executing on the one or more computers, wherein the cluster operations tier is responsible for securing a computer cluster boundary based on network filters received from the cluster operation tier console and the application operation management console giving precedence to those from the cluster operation tier console over the application operation management console to prevent a plurality of other computers that are not part of the computer cluster from accessing the one or more computers in the computer cluster.

2. A management architecture as recited in claim 1, wherein the application operations tier is responsible for securing sub-boundaries within the computer cluster boundary to restrict communication between computers within the computer cluster.

3. A management architecture as recited in claim 1, wherein the cluster operations tier is implemented at a cluster operations management console located at the same location as the one or more computers.

4. A management architecture as recited in claim 1, wherein the application operations tier monitors execution of application processes on the one or more computers and detects failures of the application processes.

5. A management architecture as recited in claim 1, wherein the application operations tier takes corrective action in response to a software failure on one of the computers.

6. A management architecture as recited in claim 5, wherein the corrective action comprises re-booting the computer.

7. A management architecture as recited in claim 5, wherein the corrective action comprises notifying an administrator of the failure.

8. A management architecture as recited in claim 1, wherein the cluster operations tier monitors hardware operation of the one or more computers and detects failures of the hardware.

9. A management architecture as recited in claim 1, wherein the cluster operations tier takes corrective action in response to a hardware failure of one of the computers.

10. A management architecture as recited in claim 9, wherein the corrective action comprises re-booting the computer.

11. A management architecture as recited in claim 9, wherein the corrective action comprises notifying a co-location facility administrator.

12. A management architecture as recited in claim 9, wherein the one or more computers are situated in one or more clusters at a co-location facility.

13. A co-location facility system comprising:
- a plurality of server node clusters, each cluster corresponding to a different customer, where each server node comprises a management component that regulates network communication between the server nodes in accordance with network filters received from one or more cluster operations management consoles and in accordance with network filters received from remote consoles of the customers, where the management components give precedence to network filters from the one or more cluster operations management consoles over the network filters from the remote consoles such that network filters from the remote consoles cannot enable communications between applications on server nodes across cluster boundaries that have been defined by the network filters received from the one or more cluster operations management consoles, wherein each management console is configured to receive node control commands from an application operations management console located remotely from the co-location facility and software components developed on an application development console, the application operations management console and application development console being located remote to each other; and
- the one or more cluster operations management consoles corresponding to one or more of the server node clusters and configured to manage hardware operations of the one or more server node clusters.

14. A system as recited in claim 13, further comprising a different cluster operations management console corresponding to each of the plurality of server node clusters.

15. A system as recited in claim 13, wherein each of the plurality of server node clusters includes, as its server nodes, a plurality of server computers.

16. A system as recited in claim 13, wherein the hardware operations include one or more of: mass storage device operation, memory device operation, and network interface operation, and processor operation.

17. A system as recited in claim 13, wherein each server node in each server node cluster is configured with a private key that allows the server node to decrypt communications that are received, in a form encrypted using a public key, from the application operations management console associated with the customer that corresponds to the node cluster.

18. A system as recited in claim 13, further comprising a data transport medium coupled to each server node in the plurality of server node clusters via which each node can access an external network.

19. A system as recited in claim 13, wherein the external network comprises the Internet.

20. A system as recited in claim 13, wherein each server node in each server node cluster is configured with the boundary of the server node cluster.

21. A system as recited in claim 13, wherein each server node in each server node cluster is configured with a private key that allows the server node to decrypt communications that are received, in a form encrypted using a public key, from at least one of the one or more cluster operations management consoles.

22. A system as recited in claim 13, wherein one or more of the server nodes in a server node cluster are leased by the customer from an operator of the co-location facility.

23. A system as recited in claim 13, wherein the one or more cluster operations management consoles are configured to manage hardware operations of the one or more server node clusters without concern for what applications are executing on server nodes of the server node cluster, and wherein the one or more server cluster operations management consoles are responsible for securing a server node cluster boundary to prevent a plurality of other server nodes that are not part of the at least one server node cluster from accessing the server nodes of the at least one server node cluster.

24. A computer readable memory having stored thereon a multi-tiered computer management architecture for implementation by a computer, the management architecture comprising:
- a first tier corresponding to an owner or lessee of a computer;
- a second tier, implemented by a cluster operations management console and a remote console that establishes network traffic boundaries based on network filters, giving preference to those from the cluster operations management console over that from the remote console, corresponding to a hardware operator that is to manage hardware operations of the computer but not application software operations of the computer;
- a third tier, implemented by an application operations management console, corresponding to a software operator that is to manage software application operations of the computer but not hardware operations of the computer; and
- a fourth tier corresponding to the owner or lessee, wherein the owner or lessee operates in the fourth tier except when revoking rights of the hardware operator or software operator.

25. An architecture as recited in claim 24, wherein the cluster operations management console is at a location remote from the computer.

26. An architecture as recited in claim 24, wherein the application operations management console is at a location remote from the computer.

27. An architecture as recited in claim 24, further comprising using a plurality of key pairs, each key pair including a private key and a public key, to securely communicate between the computer and the cluster operations management console, as well as between the computer and the application operations management console.

* * * * *